United States Patent
Shinoda et al.

(10) Patent No.: US 10,737,292 B2
(45) Date of Patent: Aug. 11, 2020

(54) LIGHT IRRADIATION DEVICE AND LIGHT IRRADIATION METHOD

(71) Applicant: USHIO DENKI KABUSHIKI KAISHA, Tokyo (JP)

(72) Inventors: Kazuhiko Shinoda, Tokyo (JP); Toshihiro Nakajima, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 16/062,570

(22) PCT Filed: Nov. 7, 2016

(86) PCT No.: PCT/JP2016/082953
§ 371 (c)(1),
(2) Date: Jun. 14, 2018

(87) PCT Pub. No.: WO2017/104292
PCT Pub. Date: Jun. 22, 2017

(65) Prior Publication Data
US 2018/0318876 A1    Nov. 8, 2018

(30) Foreign Application Priority Data

Dec. 18, 2015 (JP) ................................. 2015-247275
Sep. 5, 2016 (JP) ................................. 2016-172995

(51) Int. Cl.
*B05D 3/06* (2006.01)
*G02B 6/44* (2006.01)
(Continued)

(52) U.S. Cl.
CPC ............ *B05D 3/067* (2013.01); *C03C 25/104* (2013.01); *C03C 25/12* (2013.01); *C08J 3/28* (2013.01);
(Continued)

(58) Field of Classification Search
CPC ........ B05D 3/067; B05D 7/20; C03C 25/104; C03C 25/12; C08J 3/28; F26B 3/28; F26B 13/002; G02B 6/44
See application file for complete search history.

(56) References Cited

U.S. PATENT DOCUMENTS

| | | | |
|---|---|---|---|
| 7,399,982 B2 | 7/2008 | Siegel | |
| 2010/0142208 A1* | 6/2010 | Kokado | ................ F21V 7/0066 362/296.07 |

(Continued)

FOREIGN PATENT DOCUMENTS

| | | | |
|---|---|---|---|
| JP | S59-214010 A | 12/1984 | |
| JP | S63-123464 A | 5/1988 | |

(Continued)

OTHER PUBLICATIONS

International Search Report issued in PCT/JP2016/082953; dated Jan. 31, 2017.

(Continued)

*Primary Examiner* — Georgia Y Epps
*Assistant Examiner* — Don J Williams
(74) *Attorney, Agent, or Firm* — Studebaker & Brackett PC

(57) ABSTRACT

A light irradiation device includes at least one irradiation unit including a reflective surface which is disposed in a concave inner surface formed to have a substantially arc shape and into which a wire member is inserted, and a light source which is configured to emit light toward the wire member and is disposed so as to face the reflective surface in a direction of an optical axis of the emitted light, and an insertion portion configured to interiorly form an insertion path for inserting the wire member into the reflective sur- (Continued)

face. The reflective surface is disposed such that a center of the substantially arc shape is eccentric with respect to a center of the insertion path.

19 Claims, 22 Drawing Sheets

(51) Int. Cl.
    *F26B 13/00*     (2006.01)
    *C03C 25/12*     (2006.01)
    *C03C 25/104*    (2018.01)
    *C08J 3/28*      (2006.01)
    *F26B 3/28*      (2006.01)
    *B05D 7/20*      (2006.01)

(52) U.S. Cl.
    CPC .............. *F26B 3/28* (2013.01); *F26B 13/002* (2013.01); *G02B 6/44* (2013.01); *B05D 7/20* (2013.01)

(56) References Cited

U.S. PATENT DOCUMENTS

| 2010/0183821 A1 | 7/2010 | Hartsuiker et al. |
| 2013/0068969 A1 | 3/2013 | Childers |
| 2015/0028020 A1 | 1/2015 | Childers |
| 2018/0318876 A1 | 11/2018 | Shinoda et al. |

FOREIGN PATENT DOCUMENTS

| JP | H01-203245 A   | 8/1989 |
| JP | 2004-230297 A  | 8/2004 |
| JP | 2005-162502 A  | 6/2005 |
| JP | 2010-117531 A  | 5/2010 |
| JP | 2017-109909 A  | 6/2017 |

OTHER PUBLICATIONS

International Preliminary Report on Patentability issued in corresponding International Application No. PCT/JP2016/082953; dated Jun. 28, 2018.
An Office Action mailed by the Japanese Patent Office dated Jan. 28, 2020, which corresponds to Japanese Patent Application No. 2019-061145 and is related to U.S. Appl. No. 16/062,570.
An Office Action mailed by the Japanese Patent Office dated Jan. 28, 2020, which corresponds to Japanese Patent Application No. 2019-061149 and is related to U.S. Appl. No. 16/062,570.
An Office Action mailed by the Japanese Patent Office dated Jan. 8, 2020, which corresponds to Japanese Patent Application No. 2016-172995 and is related to U.S. Appl. No. 16/062,570.
An Office Action mailed by the Japanese Patent Office dated Jan. 24, 2020, which corresponds to Japanese Patent Application No. 2015-247275 and is related to U.S. Appl. No. 16/062,570.

\* cited by examiner

LIGHT IRRADIATION DEVICE AND LIGHT IRRADIATION METHOD

TECHNICAL FIELD

The present invention relates to a light irradiation device for emitting light toward a wire member, and further relates to a light irradiation method for emitting light toward the wire member through such a light irradiation device.

BACKGROUND ART

Conventionally, as light irradiation devices, there have been known light irradiation devices including a reflective surface with a curved-surface shape and a light source for emitting light (for example, Patent Document 1). Further, wire members have been inserted into the reflective surface, and the light source has been configured to emit light toward such wire members in a circumferential direction of the wire members. Further, as light irradiation devices, there have been also known light irradiation devices including a plurality of light sources for emitting light toward wire members introduced in the devices (for example, Patent Document 2).

PRIOR ART DOCUMENTS

Patent Documents

Patent Document 1: U.S. Pat. No. 7,399,982
Patent Document 2: JP-A-2010-117531

SUMMARY OF THE INVENTION

Problems to be Solved by the Invention

Meanwhile, in the light irradiation device according to Patent Document 1, wire members are disposed at the center of the reflective surface. However, the light irradiation device has low light efficiency, which makes it harder to effectively irradiate the wire member. Note that the light efficiency (light utilization ratio) refers to a ratio of light which actually irradiates the wire member, out of the light emitted from the light source.

Therefore, it is an object to provide a light irradiation device and a light irradiation method which are capable of improving light efficiency.

Means for Solving the Problems

There is provided a light irradiation device, which includes:

at least one irradiation unit including a reflective surface which is disposed in a concave inner surface formed to have a substantially arc shape and into which a wire member is inserted, and a light source which is configured to emit light toward the wire member and is disposed so as to face the reflective surface in a direction of an optical axis of the emitted light; and an insertion portion configured to interiorly form an insertion path for inserting the wire member into the reflective surface, wherein the reflective surface is disposed such that a center of the substantially arc shape is eccentric with respect to a center of the insertion path.

Further, the light irradiation device may have a configuration in which:

the reflective surface is disposed such that the center of the substantially arc shape is eccentric with respect to the center of the insertion path in the direction of the optical axis.

Further, the light irradiation device may have configuration in which:

the reflective surface is disposed such that the center of the substantially arc shape is eccentric in such a direction as to get closer to the light source than the center of the insertion path.

Further, the light irradiation device may have a configuration in which:

the insertion portion includes an insertion hole interiorly forming the insertion path, and the insertion hole is disposed at least inside or outside the reflective surface, such that the center of the insertion path is eccentric with respect to the center of the substantially arc shape of the reflective surface.

Further, the light irradiation device may have a configuration in which:

the reflective surface forms at least a portion of the insertion portion, and is formed such that the center of the insertion path is eccentric with respect to the center of the substantially arc shape of the reflective surface.

Further, the light irradiation device may have a configuration in which:

the reflective surface is formed of a curved surface.

Further, the light irradiation device may have a configuration in which:

the reflective surface is formed of a plurality of flat surfaces disposed in a substantially arc shape.

Further, the light irradiation device may have configuration in which:

one irradiation unit is provided as the irradiation unit, and the light source disposed so as to emit light toward the wire member from one side in a circumferential direction of the wire member.

Further, the light irradiation device may have a configuration in which:

a plurality of the irradiation units are arranged in a circumferential direction of the reflective surface, such that the light sources emit light in a plurality of directions with respect to the wire member.

Further, the light irradiation device may have a configuration in which:

a plurality of the irradiation units are arranged in an axial direction of the reflective surface, and the light sources in the plurality of the irradiation units are displaced from each other in the circumferential direction of the reflective surface, when viewed in the axial direction of the reflective surface.

There is provided a light irradiation method for irradiating a wire member with light through a light irradiation device, the light irradiation device including at least one irradiation unit including a reflective surface which is disposed in a concave inner surface formed to have a substantially arc shape and into which the wire member is inserted, and a light source which is configured to emit light toward the wire member and is disposed so as to face the reflective surface in a direction of an optical axis of the emitted light, the light irradiation method comprising:

inserting the wire member into the reflective surface such that a center of the wire member is eccentric with respect to a center of the substantially arc shape of the reflective surface; and emitting light toward the wire member from the light source.

Effect of the Invention

As described above, the light irradiation device and the light irradiation method offer an excellent advantage of improvement, of the light efficiency.

MODE FOR CARRYING OUT THE INVENTION

Hereinafter, an embodiment of a light irradiation device will be described with reference to FIGS. 1 to 14. Further, throughout the respective figures (similarly to FIGS. 15 to 33), dimension ratios in the figures are not always coincident with the actual dimension ratios. Further, dimension ratios are not always coincident with each other among the respective figures.

Figure 1:
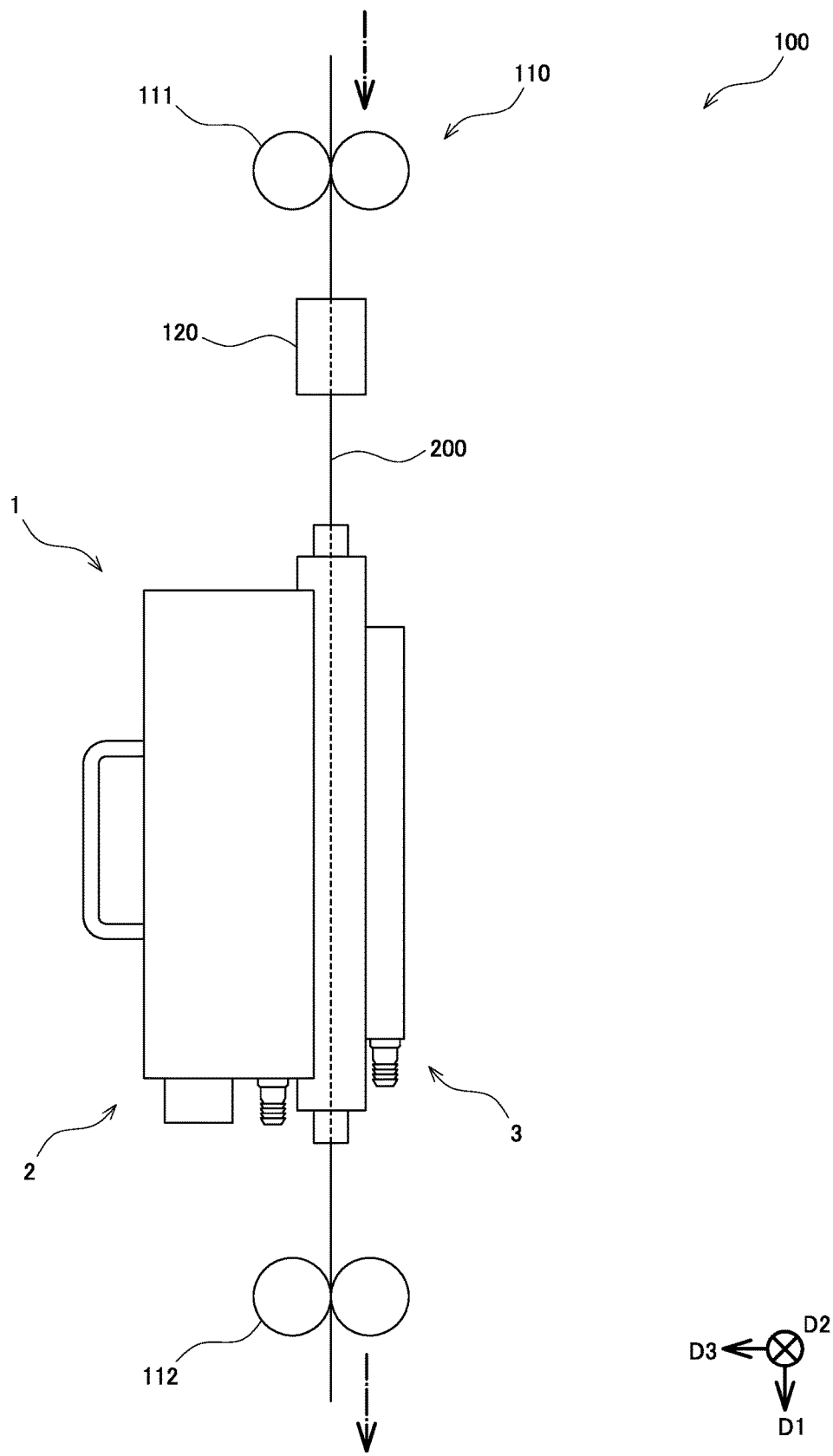
FIG. 1 is a view of entirety of a light irradiation device according to an embodiment, illustrating a state where a wire member is inserted therein.

As illustrated in FIG. 1, a light irradiation device 1 according to the present embodiment is used in an optical fiber production device 100 for producing an optical fiber 200 as a wire member 200. Thus, the optical fiber production device 100 will be described prior to descriptions of respective structures in the light irradiation device 1.

The optical fiber production device 100 includes a conveying device 110 for conveying the optical fiber 200 in a direction of conveyance (a downward direction in FIG. 1) D1, and a coating device 120 for coating the optical fiber 200 being conveyed therethrough with a UV-curable resin. Further, the conveying device 110 includes conveying members 111 and 112 for conveying the optical fiber 200 while holding the optical fiber 200, upstream and downstream of the light irradiation device 1, respectively, such that the optical fiber 200 is inserted into the light irradiation device 1 at a predetermined position therein.

Further, the light irradiation device 1 irradiates the optical fiber 200 travelling therein at a speed of 1000 meters per minute, for example, with a UV ray, in order to cure the resin applied to the optical fiber 200. Thus, the optical fiber 200 fabricated by the optical fiber production device 100 is constituted by, for example, a bare optical fiber formed of a glass fiber, and a coat film formed of a cured UV-curable resin.

Figure 2:
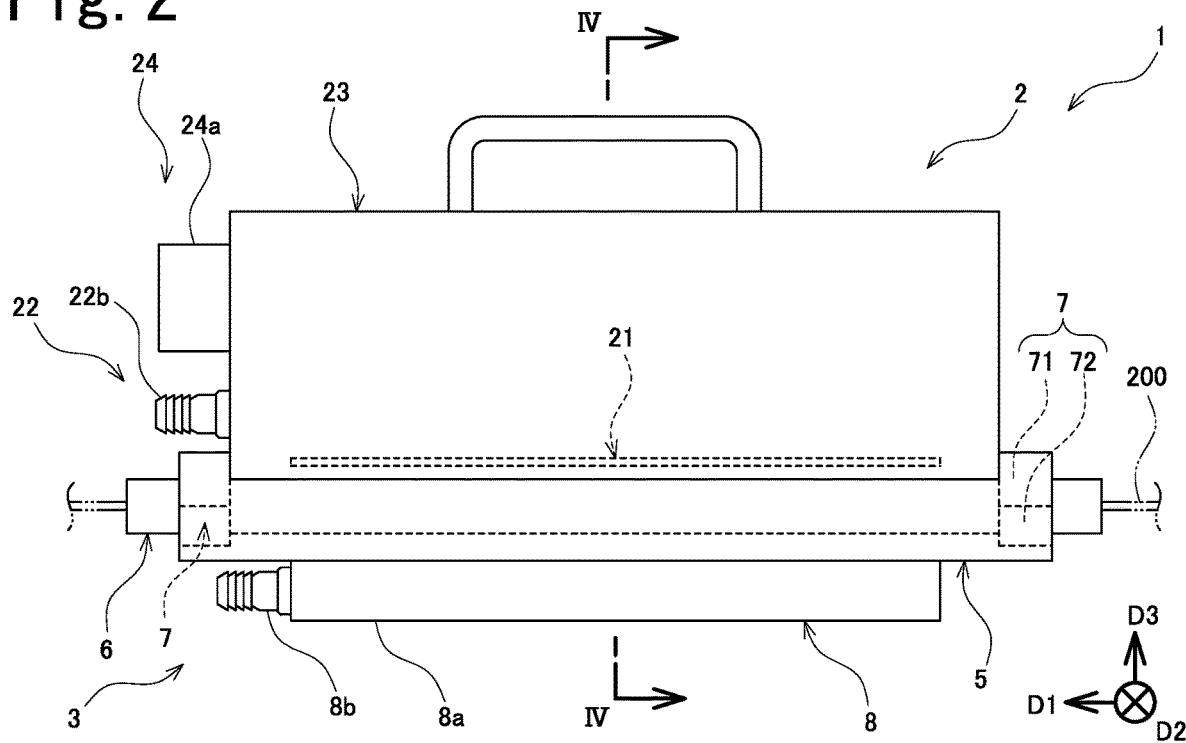
FIG. 2 is a front view of the entirety of the light irradiation device according to the embodiment.
Figure 3:
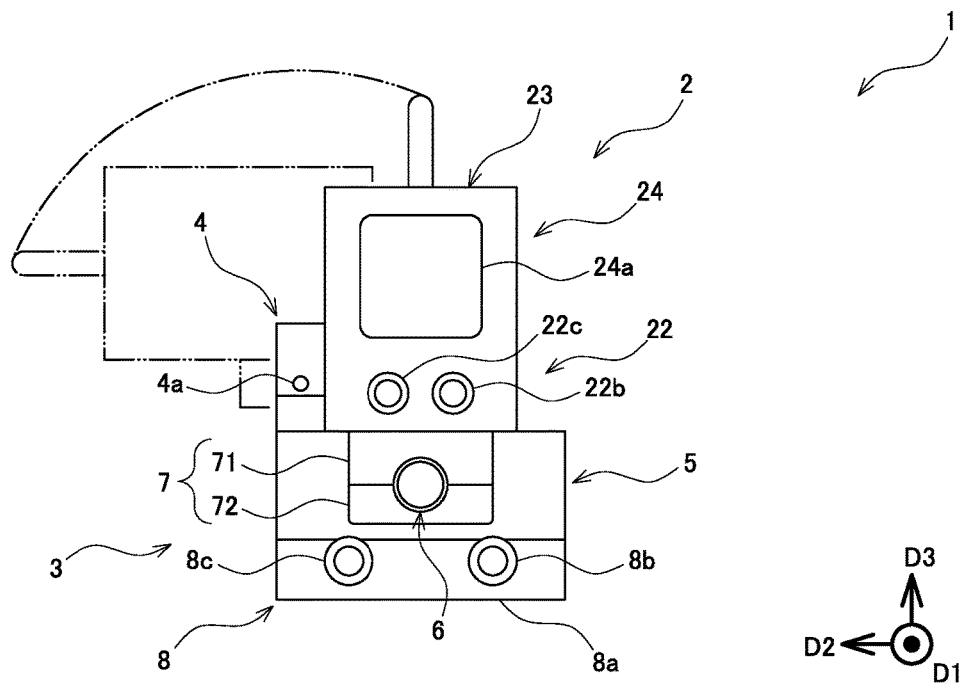
FIG. 3 is a side view of the entirety of the light irradiation device according to the embodiment.
Figure 4:
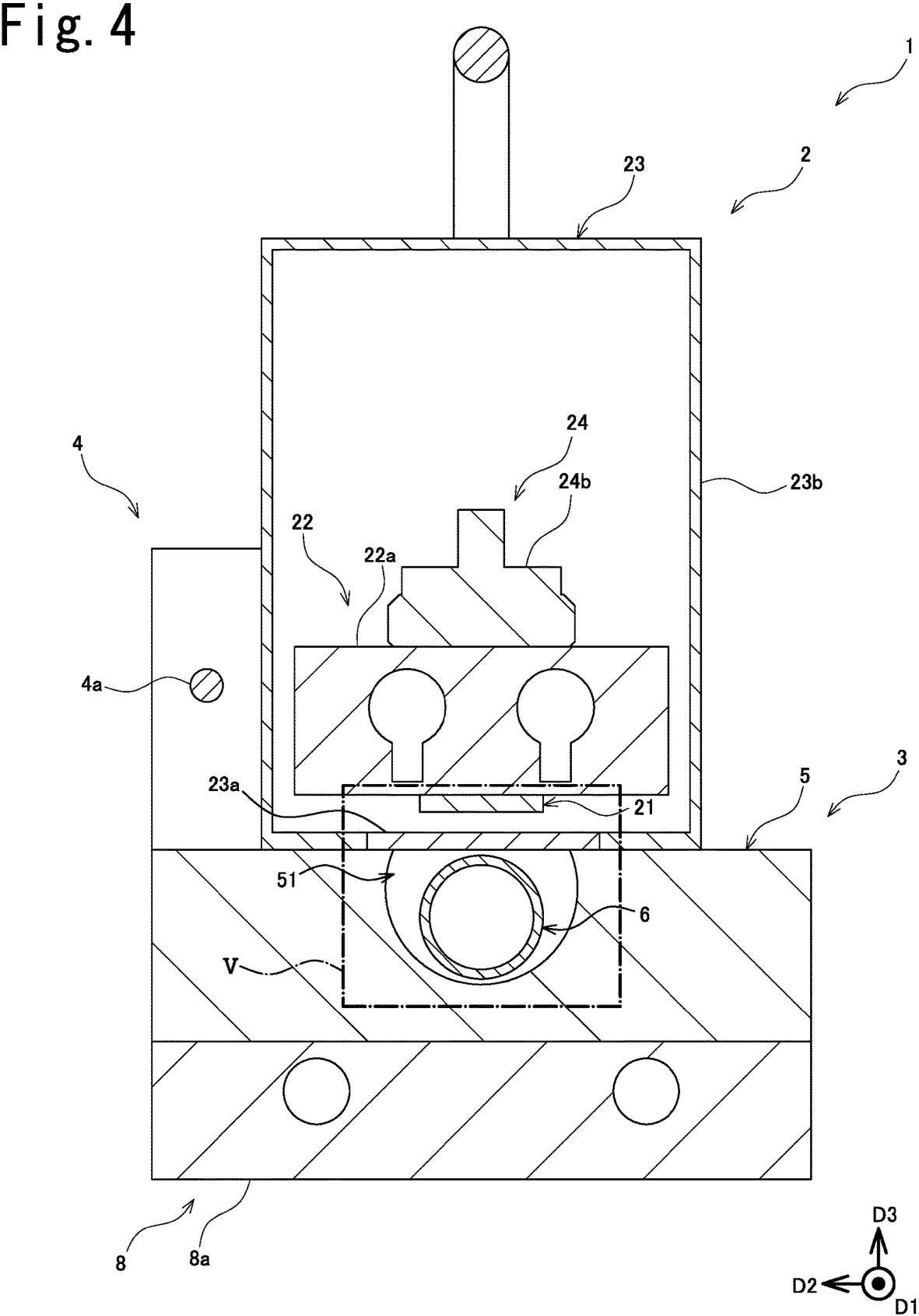
FIG. 4 is an enlarged cross-sectional view taken along line IV-IV in FIG. 2.

As illustrated in FIGS. 2 to 4, the light irradiation device 1 according to the present embodiment includes a light source device 2 configured to emit light toward the optical fiber (the wire member) 200, and an insertion device 3 into which the optical fiber 200 is inserted. Further, the light irradiation device includes a connection portion 4 for rotatably connecting the light source device 2 and the insertion device 3 to each other through a rotational shaft 4a.

The light source device 2 includes a light source 21 for emitting light toward the optical fiber 200, a light-source cooling portion 22 for cooling the light source 21, and a casing 23 for housing the light source 21 and the like. Further, the light source device 2 includes an electric-power supply portion 24 for supplying electric power to the light source 21.

The light source 21 is formed to have an elongated length, along the direction D1 of extension (the direction of conveyance) of the optical fiber 200. Further, the light source 21 is disposed so as to face the optical fiber 200. In the present embodiment, the light source 21 is configured to emit UV light (light with wavelengths of 300 nm to 400 nm, for example), in order to cure the UV-curable resin.

The light source 21 includes a light emitting portion for emitting light toward the optical fiber 200 in the circumferential direction of the optical fiber 200, and a substrate for supporting the light emitting portion. For example, the light emitting portion is constituted by a solid light source element (for example, an LED). Further, the light emitting portion is not limited to this structure, as a matter of course, and may be constituted by any member capable of emitting light toward the optical fiber 200.

The light-source cooling portion 22 includes a cooling main body 22a which is coupled to the light source 21 and configured to cause cooling water to flow therethrough, a flow-in portion 22b for causing the cooling water to flow into the cooling main body 22a, and a flow-out portion 22c for causing the cooling water to flow out of the cooling main body 22a. Further, the cooling main body 22a is disposed inside the casing 23, while the flow-in portion 22b and the flow-out portion 22c are disposed outside the casing 23.

The casing 23 includes a light transmitting portion 23a for transmitting, therethrough, light emitted from the light source 21, and a light shielding portion 23b for shielding light. The light transmitting portion 23a is formed to have an elongated length, along the direction D1 of extension (the direction of conveyance) of the optical fiber 200. Further, the light transmitting portion 23a is disposed so as to face the light source 21. Thus, the light transmitting portion 23a is disposed between the light source 21 and the optical fiber 200.

The electric-power supply portion 24 includes a power-supply connection portion 24a to which a cable or the like, for example, is connected for supplying electric power from the outside, and a terminal table 24b having various types of terminals for electrically connecting the power-supply connection portion 24a and the light source 21 to each other. Further, the power-supply connection portion 24a is disposed outside the casing 23, whale the terminal table 24b is disposed inside the casing 23.

The insertion device 3 includes a main body portion 5 into which the optical fiber 200 is inserted, an insertion portion 6 provided interiorly with an insertion path 61 for inserting the optical fiber 200 into the main body portion 5, and a securing portion for securing the insertion portion 6 to the main body portion 5. Further, the insertion device 3 includes a main-body cooling portion 8 for cooling the main body portion 5.

The main-body cooling portion 8 includes a cooling main body 8a which is coupled to the main body portion 5 and through which cooling water flows, a flow-in portion 8b for causing the cooling water to flow into the cooling main body 8a, and a flow-out portion 8c for causing the cooling water to flow out of the cooling main body 8a. Further, the main-body cooling portion 8 (the cooling main body 8a) is detachable from the main body portion 5.

Figure 5:
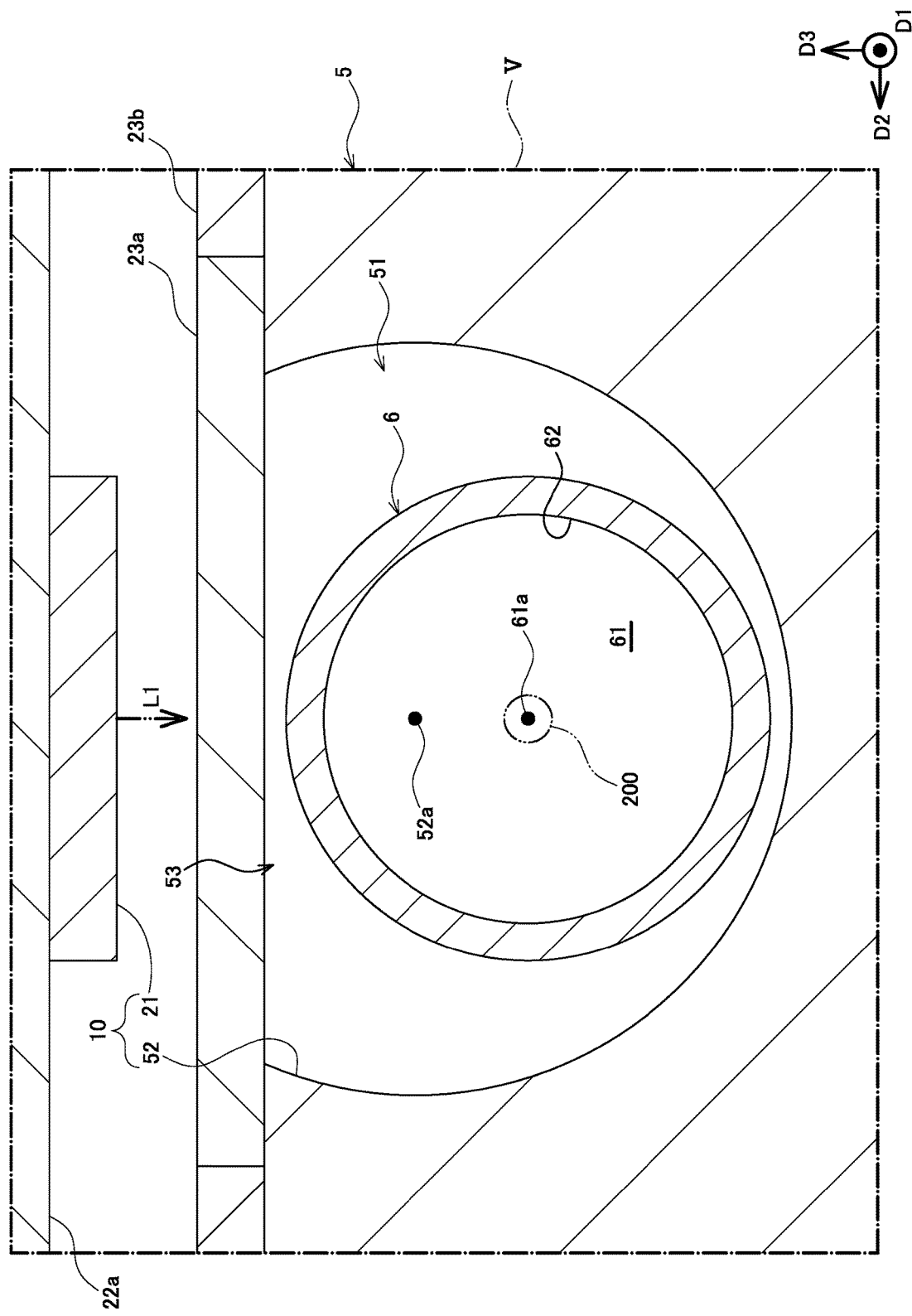
FIG. 5 is an enlarged view of an area V in FIG. 4.

As illustrated in FIGS. 4 and 5, the main body portion 5 is formed to have an elongated length, along the direction D1 of extension (the direction of conveyance) of the optical fiber 200. Further, the main body portion 5 includes a concave portion 51 into which the optical fiber 200 is inserted, along the longitudinal direction. Further, the concave portion 51 includes a reflective surface 52 for reflecting light, in its inner surface formed to have a substantially arc shape. Further, the concave portion 51 includes one opening portion 53, in its one side in the circumferential direction of the reflective surface 52.

The reflective surface 52 is formed to have an elongated length, along the direct on D1 of extension (the direction of conveyance) of the optical fiber 200. Further, the reflective surface 52 is formed to be a curved surface. More specifically, the reflective surface 52 is formed to have a substantially arc shape formed of a portion of a perfect circular shape, in its cross section in a plane orthogonal to the longitudinal direction. Further, the reflective surface 52 is formed to have a size sufficient to insert the insertion portion 6 therein.

The opening portion 53 is formed to have an elongated length, along the direction D1 of extension (the direction of conveyance) of the optical fiber 200. Further, the opening portion 53 is covered with the light transmitting portion 23a and is disposed so as to face the light source 21. Thus, light from the light source 21 is directed to the optical fiber 200 inside the reflective surface 52, by passing through the light transmitting portion 23a and the opening portion 53. Accordingly, the light source 21 is disposed so as to emit light toward the optical fiber 200 from one side in the circumferential direction of the optical fiber 200.

The insertion portion 6 includes an insertion hole 62 interiorly forming the insertion path 61, and the insertion hole 62 is disposed inside and outside the reflective surface 52. More specifically, the insertion portion 6 is formed to be a tubular member with translucency and is formed to have an elongated length, along the direction D1 of extension (the direction of conveyance) of the optical fiber 200, so that the insertion hole 62 is disposed both inside and outside the reflective surface 52. Further, the insertion hole 62 is formed to have a circular shape, in its cross section in a plane orthogonal to the longitudinal direction. That is, the insertion hole 62 interiorly forms the insertion path 61 with a circular shape.

In the present embodiment, the insertion portion 6 is constituted by a silica tube and is interiorly filled with nitrogen. Further, when the resin on the surface of the optical fiber 200 is cured, a volatile matter is induced. Therefore, the insertion portion 6 prevents this volatile matter from adhering to the light source device 2 (the light transmitting portion 23a) and the reflective surface 52.

As illustrated in FIG. 5, the reflective surface 52 is disposed such that a center 52a of the substantially arc shape is eccentric with respect to a center 61a of the insertion path 61. In other words, the insertion portion 6 (the insertion hole 62) is disposed such that the center 61a of the insertion path 61 is eccentric with respect to the center 52a of the substantially arc shape of the reflective surface 52.

Further, the reflective surface 52 is disposed such that the center 52a is eccentric with respect to the center 61a of the insertion path 61, in a direction L1 of the optical axis of light emitted from the light source 21 (in such a direction as to get closer to and away from the light source 21). In other words, the insertion portion 6 (the insertion hole 62) is disposed such that the center 61a of the insertion path 61 is eccentric with respect to the center 52a of the substantial arc shape of the reflective surface 52, in the direction L1 of the optical axis.

Further, the reflective surface 52 is disposed such that the center 52a is eccentric in such a direction as to get closer to the light source 21 than the center 61a of the insertion path 61. In other words, the insertion portion 6 (the insertion hole 62) is disposed such that the center 61a of the insertion path 61 is eccentric with respect to the center 52a of the reflective surface 52, in such a direction as to get away from the light source 21.

In the present embodiment, the arrangement of the light source 21 and the reflective surface 52 is line symmetric with respect to the direction L1 of the optical axis and, for example, is line symmetric with respect to a straight line passing through the center 52a of the reflective surface 52 and the center 61a of the insertion path 61. Further, the center 61a of the insertion path 61 is the center of an inscribed circle inscribed on the surface forming the insertion path 61 (the inner surface of the insertion hole 62, in the present embodiment).

As described above, the light irradiation device 1 according to the present embodiment includes one irradiation unit 10 including the light source 21 and the reflective surface 52. Further, in the irradiation unit 10, the light source 21 is disposed so as to face the reflective surface 52, in the direction L1 of the optical axis of light emitted therefrom.

Figure 6:
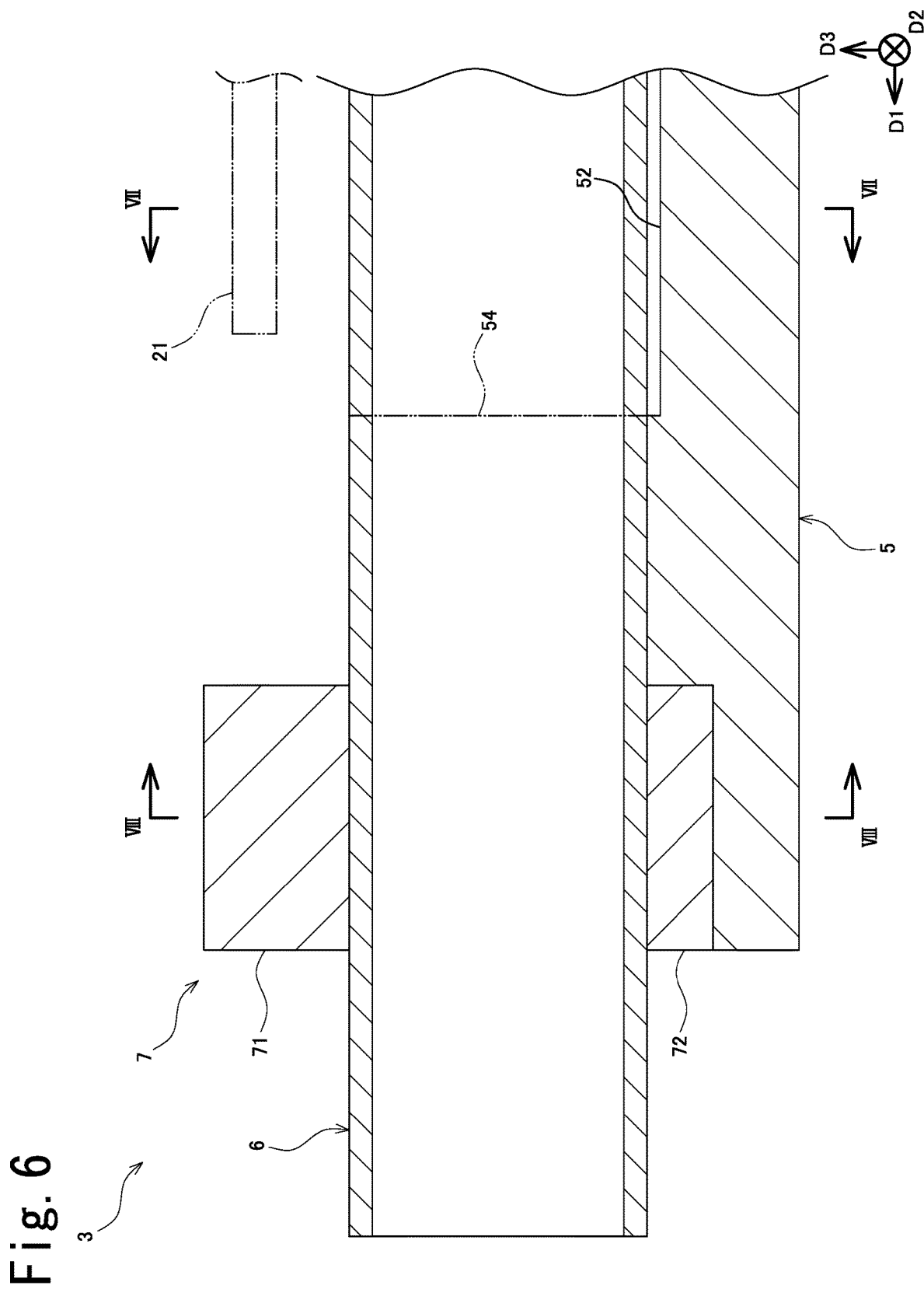
FIG. 6 is a cross-sectional view of main portions of an insertion unit according to the embodiment.
Figure 7:
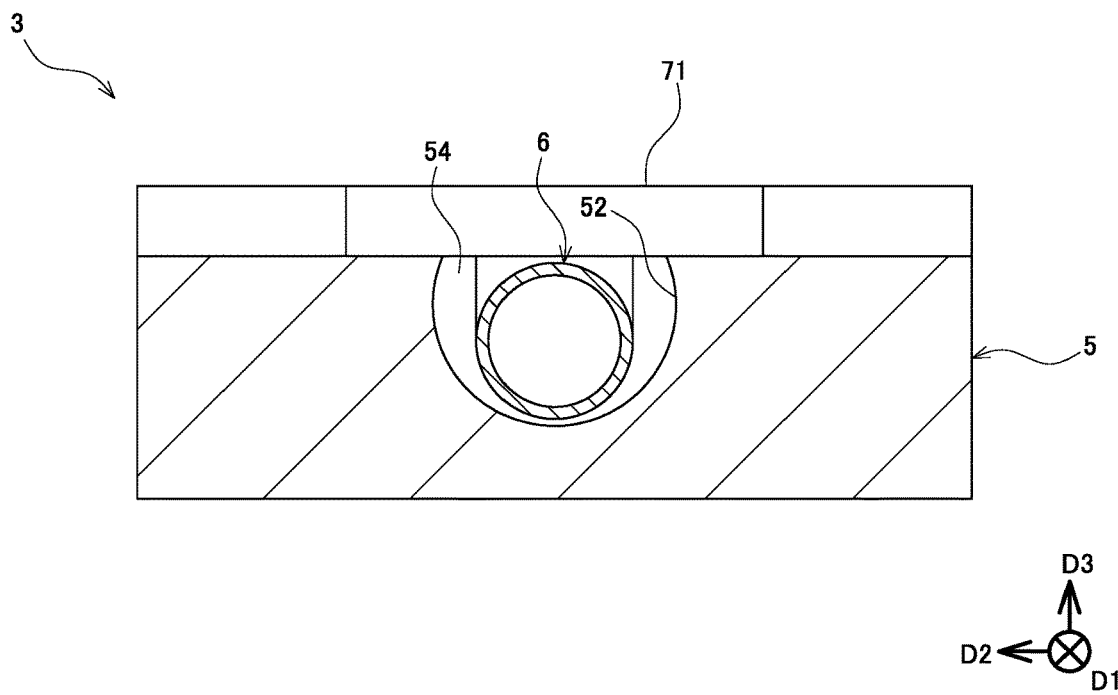
FIG. 7 is a cross-sectional view of the insertion unit according to the embodiment, taken along line VII-VII in FIG. 6.

As illustrated in FIGS. 6 and 7, the main body portion 5 includes reflective end surfaces 54 for reflecting light, at its respective opposite end portions in the longitudinal direction. Further, the reflective end surfaces 54 are disposed so as to cover a portion of the gap between the insertion portion 6 and the reflective surface 52.

Figure 8:
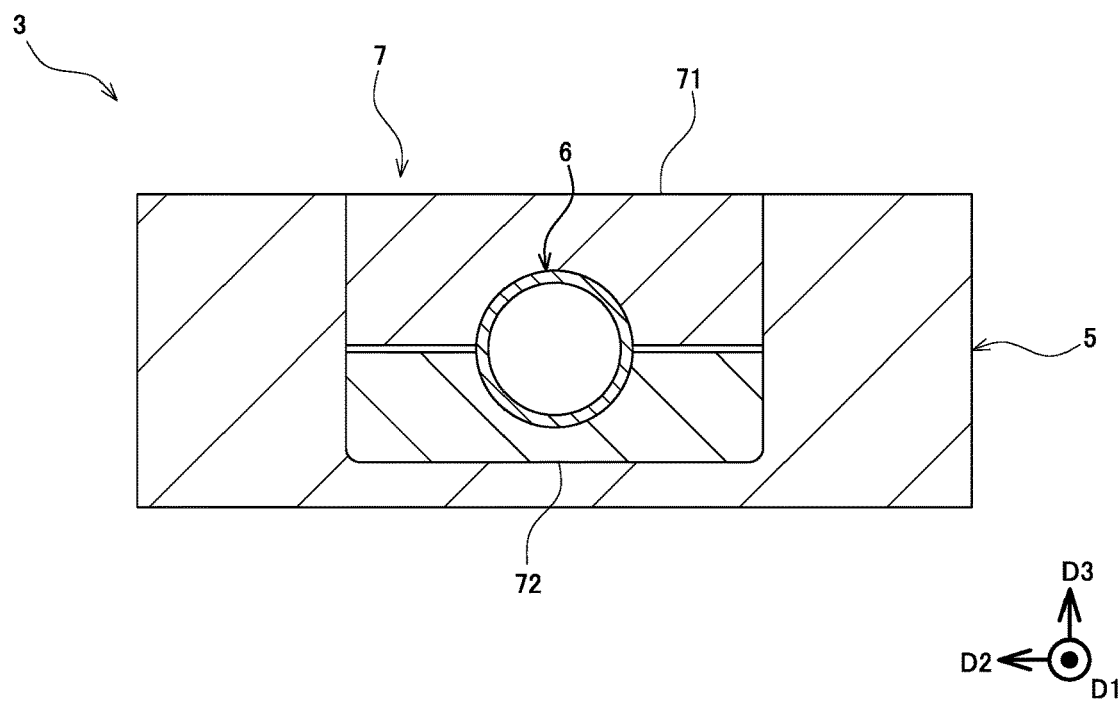
FIG. 8 is a cross-sectional view of the insertion unit according to the embodiment, taken along line VIII-VIII in FIG. 6.

As illustrated in FIGS. 6 and 8, the securing portion 7 includes a pair of sandwiching portions 71 and 72 for sandwiching the insertion portion 6 therebetween. Further, the securing portion 7 secures the end portions of the insertion portion 6 in the longitudinal direction and the end portions of the main body portion 5 in the longitudinal direction to each other, by sandwiching the end portions of the insertion portion 6 in the longitudinal direction between the pair of the sandwiching portions 71 and 72.

The light irradiation device 1 according to the present invention has the aforementioned structure and, next, there will be described an example of effects and advantages of the eccentricity of the center of the wire member 200 with respect to the center 52a of the substantially arc shape of the reflective surface 52, with reference to FIGS. 9 and 10. Further, it is assumed that the center of the wire member 200 is positioned at the center 61a of the insertion path 61.

Figure 9:
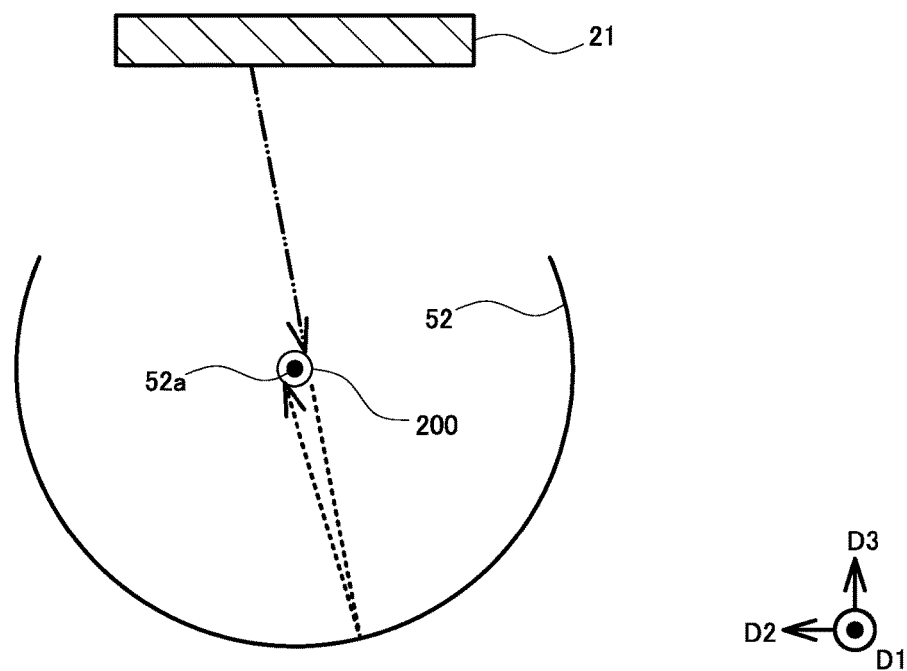
FIG. 9 is a cross-sectional view of main portions of a light irradiation device in a comparative example, illustrating a state where a wire member is irradiated with light.
Figure 10:
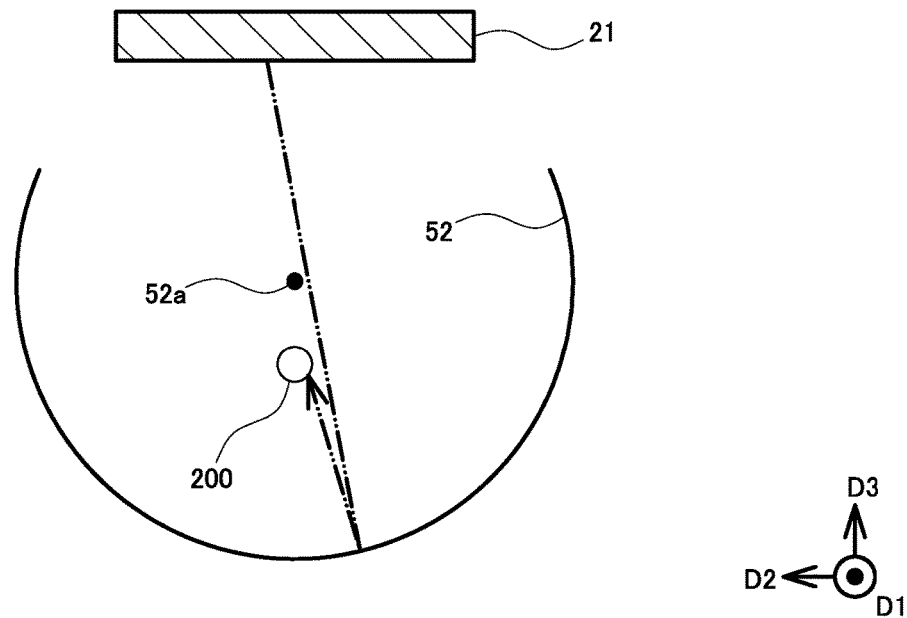
FIG. 10 is a cross-sectional view of main portions of the light irradiation device in the example in FIG. 5, illustrating a state where the wire member is irradiated with light.

Further, the positions of the light source 21 and the reflective surface 52 in an example in FIG. 10 are different from those in a comparative example in FIG. 9, but the positions of the light source 21 and the wire member 200 in the example in FIG. 10 are the same as those in the comparative example in FIG. 9. Accordingly, the quantity of light which directly irradiates the wire member 200 without being reflected by the reflective surface 52 after being emitted from the fight source 21 is the same.

On the other hand, in the comparative example in FIG. 9, the center of the wire member 200 is coincident with the center 52a of the substantially arc shape of the reflective surface 52. With this structure, in order that light irradiates the rear surface side of the wire member 200 (the opposite side from its surface facing the light source 21, and its lower surface side in FIGS. 9 and 10. The same applies to FIGS. 11 and 12), it is necessary that the light is reflected by the reflective surface 52 after passing by the center 52a of the substantially arc shape of the reflective surface 52 (see a broken line in FIG. 9).

However, such light which passes by the center 52a of the substantially arc shape of the reflective surface 52 is caused to directly irradiate the front surface side of the wire member 200 (its surface facing the light source 21, and its upper surface side in FIGS. 9 and 10) (see a two-dot chain line in FIG. 9). Accordingly, in the comparative example in FIG. 9, the light reflected by the reflective surface 52 after being emitted from the light source 21 can hardly irradiate the wire member 200. Thus, the rear surface side of the wire member 200 is hardly irradiated with light, as compared with the front surface side of the wire member 200.

On the other hand, in the example in FIG. 10, the center of the wire member 200 is eccentric with respect to the center 52a of the substantially arc shape of the reflective surface 52. With this structure, it is not necessary that light passes by the position of the wire member 200, in order to irradiate the rear surface side of the wire member 200. Accordingly, a portion of the light reflected by the reflective surface 52 after being emitted from the light source 21 irradiates the rear surface side of the wire member 200. Thus, the rear surface side of the wire member 200 is irradiated with light, similarly to the front surface side of the wire member 200.

Accordingly, in the example of FIG. 10, even though the quantity of light which directly irradiates the wire member 200 after being emitted from the light source 21 is the same as that in the comparative example in FIG. 9, the quantity of light which irradiates the wire member 200 after being emitted from the light source 21 and further reflected by the reflective surface 52 is completely different from that in the comparative example in FIG. 9. By making the center of the wire member 200 eccentric with respect to the center 52a of the substantially arc shape of the reflective surface 52, as described above, it is possible to improve the light efficiency.

Further, in the case of employing the reflective surface 52 with the substantially arc shape, in the comparative example in FIG. 9, the light does not irradiate the side surface sides (the left surface side and the right surface side in FIG. 9) of the wire member 200 disposed at the center 52a of the substantially arc shape of the reflective surface 52. This is because of the following. That is, the ray of light directed to the center 52a of the substantially arc shape of the reflective surface 52 geometrically composed of only direct light from the light source 21 disposed at one side in the circumferential direction of the wire member 200, and light which is incident normally to the reflective surface and is reflected thereby. Therefore, the ranges of the direct light and the reflected light toward the center 52a of the substantially arc shape are limited to the front surface side and the rear surface side. Therefore, the side surface sides are unlikely to be irradiated with light, which makes it harder to attain uniform light irradiation over the circumferential direction of the wire member 200.

Next, there will be described an example of effects and advantages of the eccentricity of the center 52a of the reflective surface 52 with respect to the center of the wire member 200 in the direction L1 of the optical axis, with reference to FIGS. 11 and 12. Further, it is assumed that the center of the wire member 200 is positioned at the center 61a of the insertion path 61.

Figure 11:
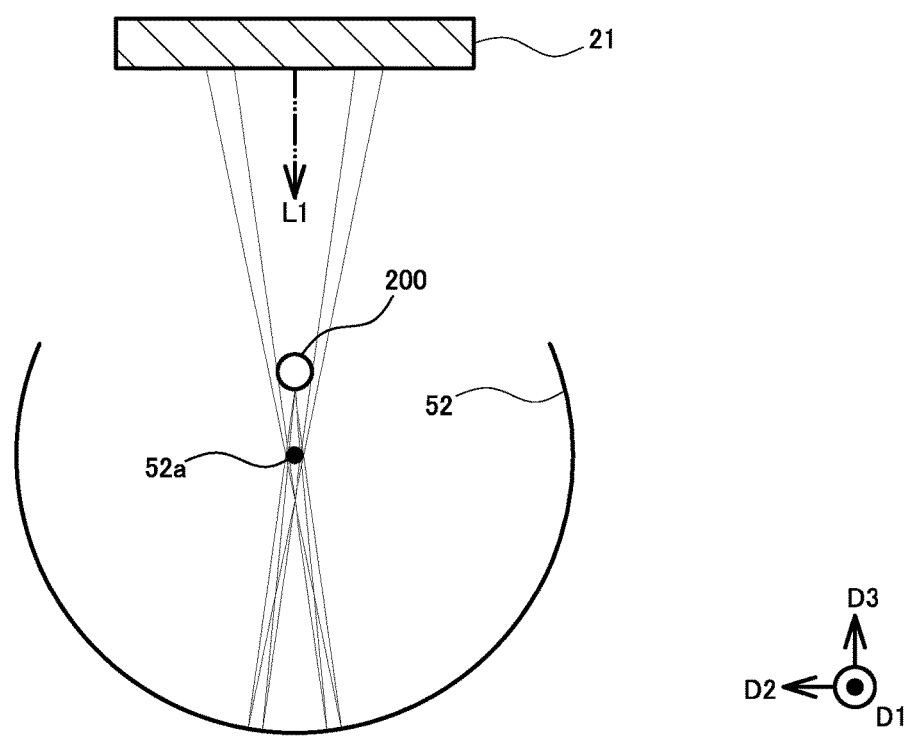
FIG. 11 is a cross-sectional views of main portions of a light irradiation device in another example, illustrating a state where a wire member is irradiated with light.
Figure 12:
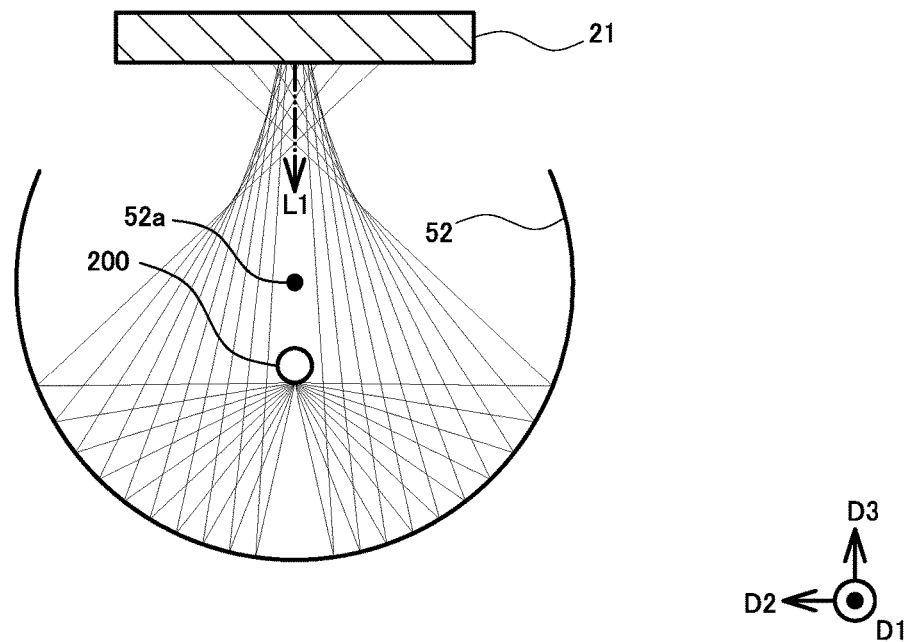
FIG. 12 is a cross-sectional view of main portions of the light irradiation device in the example in FIG. 5, illustrating a state where the wire member is irradiated with light.

At first, in examples of FIGS. 11 and 12, the center 52a of the reflective surface 52 is eccentric with respect to the center of the wire member 200 in the direction L1 of the optical axis. More specifically, the wire member 200 is disposed at a position in the direction L1 of the optical axis from the center of the light source 21 in a widthwise direction D2. Thus, the quantity of light in the direction L1 of the optical axis, out of the light emitted from the light source 21, is largest, so that the quantity of light which directly irradiates the wire member 200 after being emitted from the light source 21 is largest. Accordingly, with this structure, it is possible to effectively improve the light efficiency.

As described above, it is preferable that the center 52a of the reflective surface 52 is eccentric with respect to the center of the wire member 200 in the direction L1 of the optical axis. That is, it is preferable that the center 52a of the reflective surface 52 is eccentric with respect to the center 61a of the insertion path 61 in the direction L1 of the optical axis. Note that the present invention is not limited to this structure, as a matter of course.

Next, there will be described an example of effects and advantages of the eccentricity of the center 52a of the reflective surface 52 in the direction in which the center 52a of the reflective surface 52 gets closer to the light source 21 than the center of the wire member 200, with reference to FIGS. 11 and 12. Further, it is assumed that the center of the wire member 200 is positioned at the center 61a of the insertion path 61.

At first, the positions of the light source 21 and the reflective surface 52 in an example in FIG. 11 are different from those in an example in FIG. 12, but the positions of the light source 21 and the wire member 200 in the example in FIG. 11 are the same as those in the example in FIG. 12. Accordingly, the quantity of light which directly irradiates the wire member 200 without being reflected by the reflective surface 52 after being emitted from the light source 21 is the same.

Further, in the example in FIG. 11, the center 52a of the reflective surface 52 is eccentric in such a direction as to get farther away from the light source 21 than the center of the wire member 200. Thus, the rear surface side of the wire member 200 is farther away from the reflective surface 52. This reduces the light which irradiates the rear surface side of the wire member 200. Further, thin solid lines in FIG. 11 (similarly to FIG. 12) indicate light which irradiates an end point on the rear surface of the wire member 200, after being emitted from the light source 21 and reflected only once by the reflective surface 52.

On the other hand, in the example in FIG. 12, the center 52a of the reflective surface 52 is eccentric in such a direction as to get closer to the light source 21 than the center of the wire member 200. Further, the amount of eccentricity thereof is equal to the amount of eccentricity in FIG. 11. Thus, the rear surface side of the wire member 200 is closer to the reflective surface 52. This increases the light which irradiates the rear surface side of the wire member 200. Accordingly, with this structure, it is possible to effectively improve the light efficiency.

As described above, it is preferable that the center 52a of the reflective surface 52 is eccentric in such a direction as to get closer to the light source 21 than the center of the wire member 200. That is, it is preferable that the center 52a of the reflective surface 52 is eccentric in such a direction as to get closer to the light source 21 than the center 61a of the insertion path 61. Note that the present invention is not limited to this structure, as a matter of course.

Hereinafter, there will be described examples and a comparative example of the light irradiation device 1, with reference to FIGS. 13 and 14, for the sake of concretely proving the descriptions regarding FIGS. 9 to 12.

The quantity of light which actually irradiated the wire member 200, out of light emitted from the light source 21, was determined through ray tracing, assuming that the light was uniformly emitted from the entire surface of the light source 21. Further, phenomena which cause light losses include cases where light is repeatedly reflected by the reflective surface 52 to be attenuated without being incident to the wire member 200, cases where reflected light is incident to the light source 21 to be attenuated thereby, cases where light is incident to portions (for example, the light transmitting portion 23a and the like) other than the reflective surface 52 and the wire member 200, cases where light is attenuated when being reflected by the reflective surface 52, cases where light is attenuated when transmitting the insertion portion 6, and the like.

Figure 13:
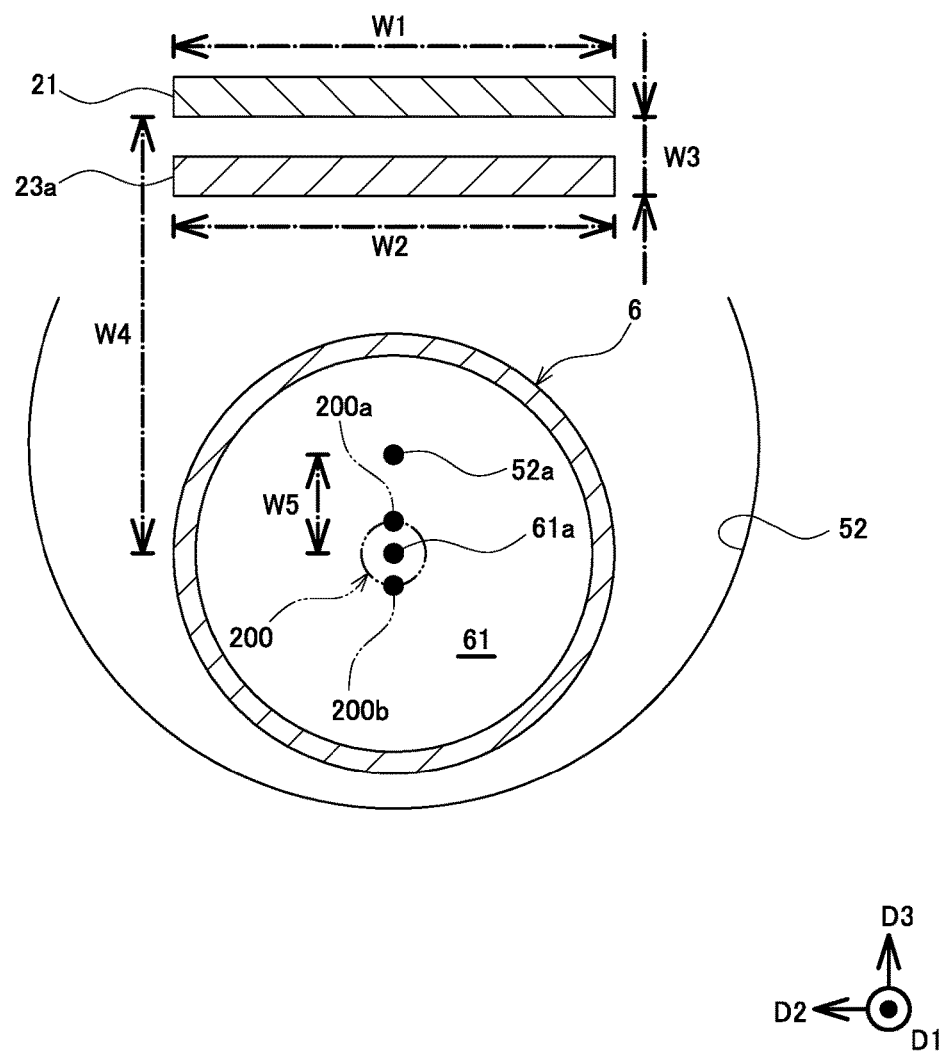
FIG. 13 is a cross-sectional view of main portions of the light irradiation device used for evaluations of the examples and the comparative example.

As illustrated in FIG. 13, the quantity of light was determined with the light irradiation device 1 under the following conditions.

The diameter of the reflective surface 52: 27.4 mm
The reflectivity of the reflective surface 52: 85%
The outer diameter of the insertion portion 6: 20 mm
The inner diameter of the insertion portion 6: 18 mm
The transmittance of the insertion portion 6: 100% (here, Fresnel reflection was considered)
The width size W1 of the light source 21: 10 mm
The width size W2 of the light transmitting portion 23a: 26 mm
The distance W3 from the surface of the light source 21 to the inner surface of the light transmitting portion 23a: 4.5 mm
The distance W4 from the surface of the light source 21 to the center of the wire member 200: 12 mm
The diameter of the wire member 200: 0.125 mm
An amount of eccentricity W5 of the center 52a of the substantially arc shape of the reflective surface 52 with respect to the center of the wire member 200 (the center 61a of the insertion path 61) was varied, by displacing the reflective surface 52 with respect to the light source 21. That is, the positional relationship (the distance) between the wire member 200 and the light source 21 was not varied.

Figure 14:
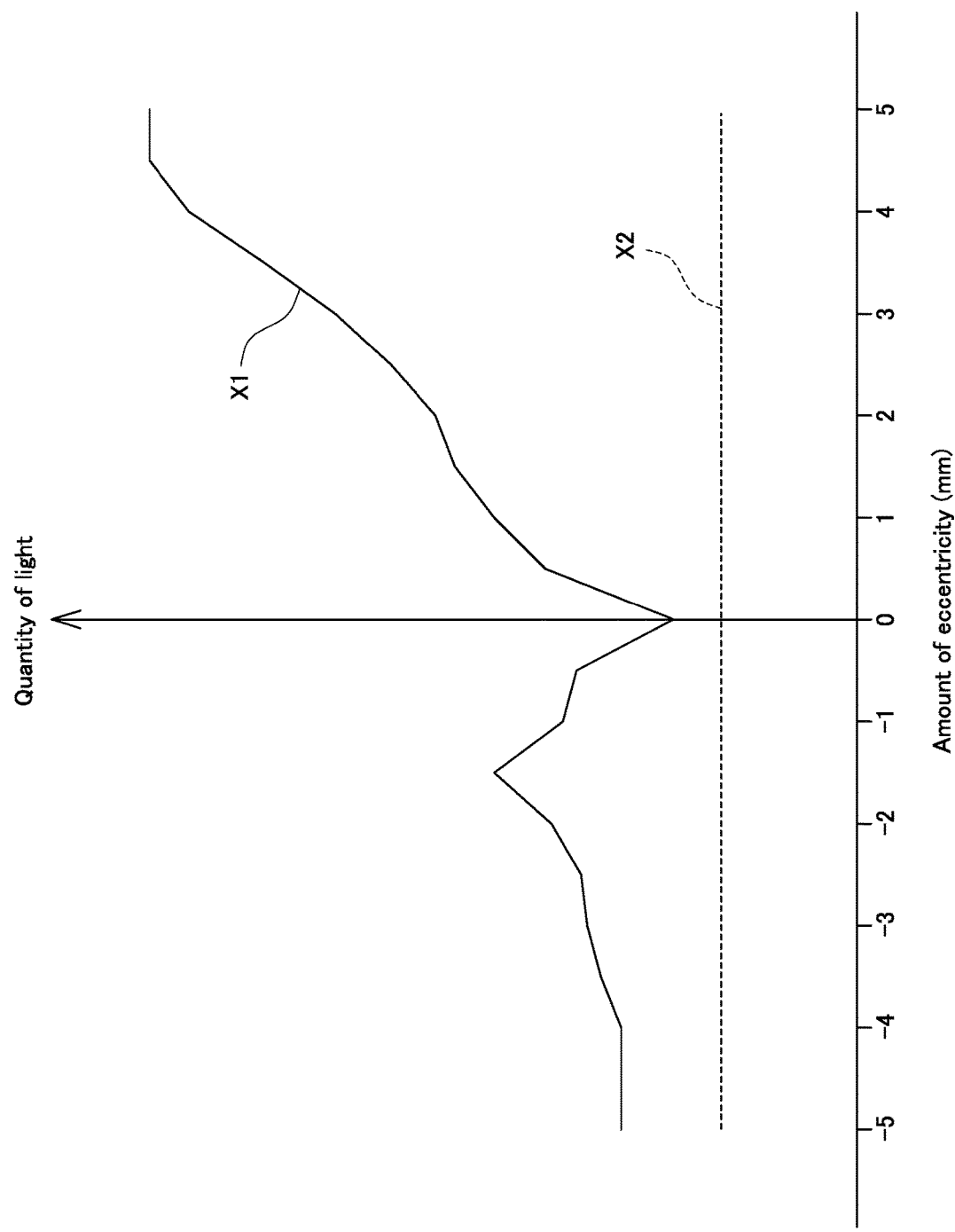
FIG. 14 is a graph illustrating a relationship between an amount of eccentricity of a center of the wire member with respect to a center of a reflective surface, and a quantity of light which irradiates a wire member.

FIG. 14 shows the relationship between the amount of eccentricity W5 and the quantity of light which irradiates the wire member 200, in the light irradiation device 1 under the aforementioned conditions. Further, it is assumed that the amount of eccentricity W5 is positive (+) when the center of the reflective surface 52 is eccentric in such a direction as to get closer to the light source than the center of the wire member 200 (that is, when the center of the wire member 200 is eccentric in such a direction as to get farther away from the light source 21 than the center 52a of the reflective surface 52), and the amount of eccentricity W5 is negative (−) when the center of the reflective surface 52 is eccentric in such a direction as to get farther away from the light source than the center of the wire member 200 (that is, when the center of the wire member 200 is eccentric in such a direction as to get closer to the light source 21 than the center 52*a* of the reflective surface 52).

Further, in FIG. 14, a solid line X1 represents a total quantity X1 of irradiation light which actually irradiated the wire member 200, out of light emitted from the light source 21. A broken line X2 represents a quantity X2 of direct irradiation light which directly irradiated the wire member 200 without passing the reflective surface 52, out of the light emitted from the light source 21. Accordingly, the result obtained by subtracting the quantity of light represented by the broken line X2 from the total quantity of light represented by the solid line X1 is the quantity of reflected irradiation light which irradiated the wire member 200 by passing the reflective surface 52, out of the light emitted from the light source 21.

In the examples where the amount of eccentricity W5 existed, the total quantity X1 of irradiation light was higher than the total quantity X1 of irradiation light in the comparative example where the amount of eccentricity W5 did not exist (the amount of eccentricity W5 was 0 mm). Thus, the total quantity X1 of irradiation light could be increased by making the center 52*a* of the reflective surface 52 eccentric with respect to the center of the wire member 200.

On the other hand, since the positional relationship (the distance) between the wire member 200 and the light source 21 was not varied, as described above, the quantity X2 of direct irradiation light was constant regardless of the amount of eccentricity W5. Therefore, the quantity of reflected irradiation light was increased, by making the center 52*a* of the reflective surface 52 eccentric with respect to the center of the wire member 200. Accordingly, as described with reference to FIGS. 9 and 10, it is possible to improve the light efficiency, by making the center of the wire member 200 eccentric with respect to the center 52*a* of the reflective surface 52.

Further, in the examples where the center of the reflective surface 52 was eccentric in such a direction (in the positive side) as to get closer to the light source than the center of the wire member 200, the total quantity X1 of irradiation light was higher than the total quantity X1 of irradiation light in the examples where the center of the reflective surface 52 was eccentric in such a direction (in the negative side) as to get farther away from the light source than the center of the wire member 200.

Thus, the total quantity X1 of irradiation light, that is, the quantity of reflected irradiation light could be increased by making the center of the reflective surface 52 eccentric in such a direction as to get closer to the light source than the center of the wire member 200. Accordingly, as described with reference to FIGS. 11 and 12, it is possible to effectively improve the light efficiency, by making the center of the reflective surface 52 eccentric in such a direction as to get closer to the light source than the center of the wire member 200.

As described above, the light irradiation method for irradiating a wire member 200 with light through a light irradiation device 1, the light irradiation device 1 including at least one irradiation unit 10 including a reflective surface 52 which is disposed in a concave inner surface formed to have a substantially arc shape and into which the wire member 200 is inserted, and a light source 21 which is configured to emit light toward the wire member 200 and is disposed so as to face the reflective surface 52 in a direction L1 of an optical axis of the emitted light, the light irradiation method comprising: inserting the wire member 200 into the reflective surface 52 such that center of the wire member 200 is eccentric with respect to a center 52*a* of the substantially arc shape of the reflective surface 52; and emitting light toward the wire member 200 from the light source 21.

The light irradiation device 1 according to the embodiment including: at least one (one in this embodiment) irradiation unit 10 including a reflective surface 52 which is disposed in a concave inner surface formed to have a substantially arc shape and into which a wire member 200 is inserted, and a light source 21 which is configured to emit light toward the wire member 200 and is disposed so as to face the reflective surface 52 in a direction L1 of an optical axis of the emitted light; and an insertion portion 6 configured to interiorly form an insertion path 61 for inserting the wire member 200 into the reflective surface 52, wherein the reflective surface 52 is disposed such that a center 52*a* of the substantially arc shape is eccentric with respect to a center 61*a* of the insertion path 61.

With this structure, the irradiation unit 10 includes the reflective surface 52 disposed in the concave inner surface formed to have a substantially arc shape, and the light source 21 which is configured to emit light and disposed to face the reflective surface 52 in the direction L1 of the optical axis of this emitted light. Further, the wire member 200 is inserted into the reflective surface 52, and the light source 21 is configured to emit light toward the wire member 200.

On the other hand, the insertion portion 6 interiorly forms the insertion path 61 for inserting the wire member 200 into the reflective surface 52. Further, the center 52*a* of the substantially arc shape of the reflective surface 52 is eccentric with respect to the center 61*a* of the insertion path 61, so that the wire member 200 is positioned so as to deviate from the center 52*a* of the reflective surface 52. Accordingly, a portion of the light reflected by the reflective surface 52 after being emitted from the light source 21 propagates toward the wire member 200 and irradiates the wire member 200. This can increase the light efficiency.

In the light irradiation device 1 according to the embodiment, the reflective surface 52 is disposed such that the center 52*a* of the substantially arc shape is eccentric with respect to the center 61*a* of the insertion path 61 in the direction L1 of the optical axis.

With this structure, the center 52*a* of the substantially arc shape of the reflective surface 52 eccentric with respect to the center 61*a* of the insertion path 61 in the direction L1 of the optical axis. Thus, since the quantity of light in the direction L1 of the optical axis, out of the light emitted from the light source 21, is largest, at least the quantity of light which directly irradiates the wire member 200 after being emitted from the light source 21 can be made larger. Accordingly, it is possible to further improve the light efficiency.

In the light irradiation device 1 according to the embodiment, the reflective surface 52 is disposed such that the center 52*a* of the substantially arc shape is eccentric in such a direction as to get closer to the light source 21 than the center 61*a* of the insertion path 61.

With this structure, the center 52*a* of the substantially arc shape of the reflective surface 52 is eccentric in such a direction as to get closer to the light source 21 than the center 61*a* of the insertion path 61, so that the reflective surface 52 is disposed so as to be closer to the wire member 200. Thus, the quantity of light which propagates toward the wire member 200 after being reflected by the reflective surface 52 can be made larger. This can effectively improve the light efficiency.

In the light irradiation device 1 according to the embodiment, the insertion portion 6 includes an insertion hole 62 interiorly forming the insertion path 61, and the insertion hole 62 is disposed at least inside or outside (more specifically, both inside and outside) the reflective surface 52, such that the center 61a of the insertion path is eccentric with respect to the center 52a of the substantially arc shape of the reflective surface 52.

With this structure, the insertion hole 62 interiorly forms the insertion path 61 and is disposed at least inside or outside (more specifically, both inside and outside) the reflective surface 52. Further, the insertion hole 62 is disposed such that the center 61a of the insertion path 61 is eccentric with respect to the center 52a of the substantially arc shape of the reflective surface 52. Thus, since the wire member 200 is inserted in the insertion hole 62, the center of the wire member 200 is certainly made eccentric with respect to the center 52a or the substantially arc shape of the reflective surface 52.

In the light irradiation device 1 according to the embodiment, the reflective surface 52 is formed of a curved surface.

In the light irradiation device 1 according to the embodiment, one irradiation unit 10 is provided as the irradiation unit 10, and the light source 21 is disposed so as to emit light toward the wire member 200 from one side in a circumferential direction of the wire member 200.

The light irradiation device and the light irradiation method is not limited to the configuration of the embodiment described above, and the effects are not limited to those described above. It goes without saying that the light irradiation device and the light irradiation method can be variously modified without departing from the scope of the subject matter of the present invention. For example, the constituents, methods, and the like of various modified examples described below may be arbitrarily selected and employed as the constituents, methods, and the like of the embodiments described above, as a matter of course.

Figure 15:
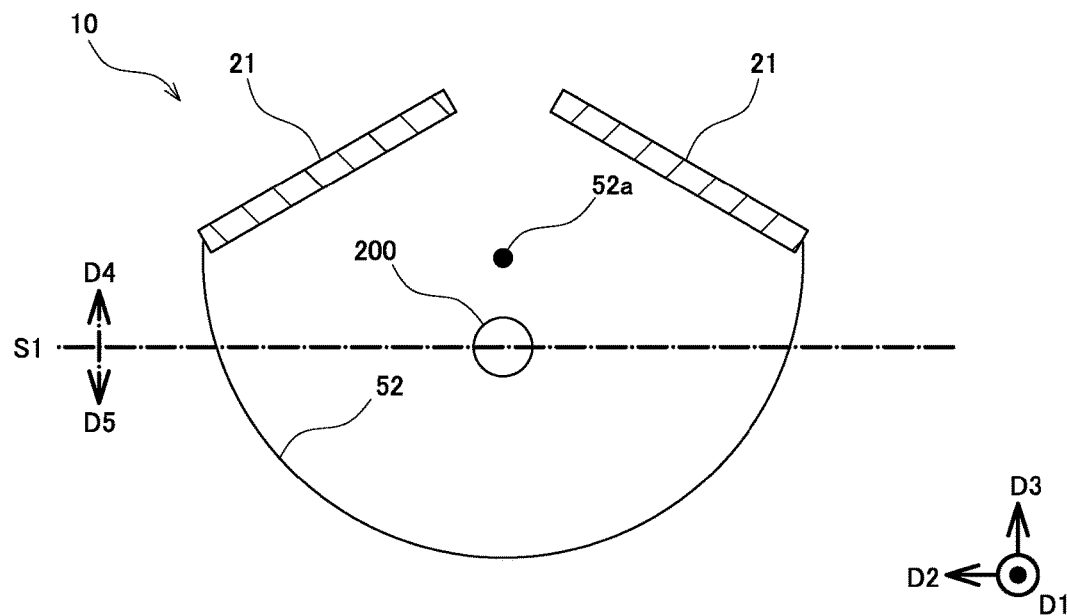
FIG. 15 is a cross-sectional view of main portions of a light irradiation device according to still another embodiment, illustrating arrangement of light sources.
Figure 16:
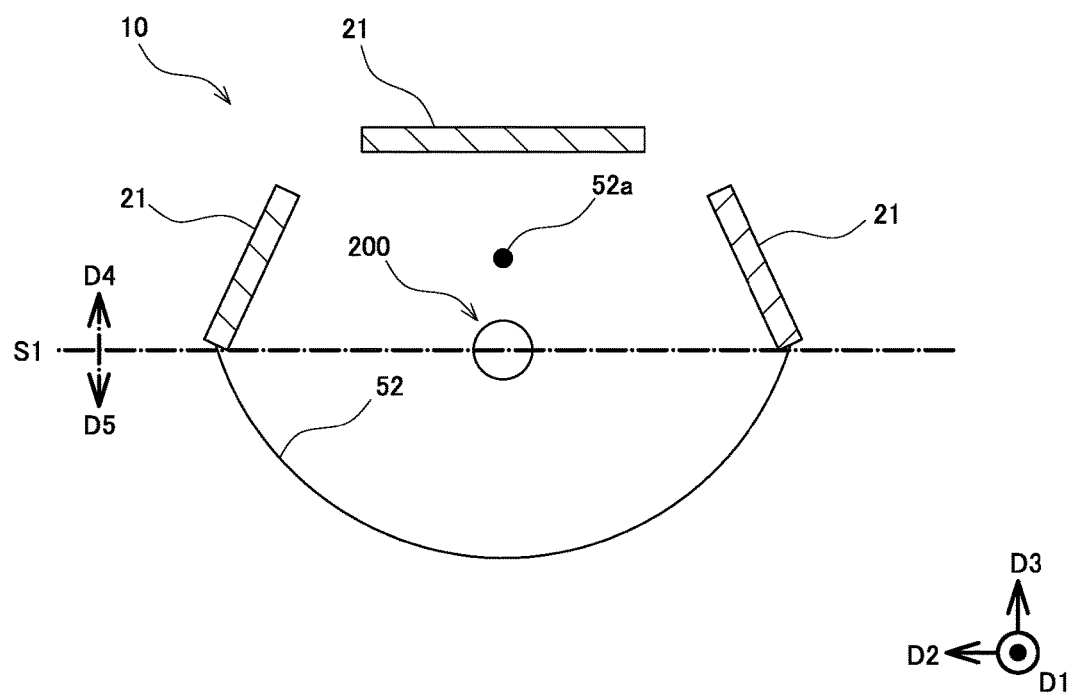
FIG. 16 is a cross-sectional view of main portions of a light irradiation device according to yet another embodiment, illustrating the arrangement of light sources.

In the light irradiation device 1 according to the aforementioned embodiment, the irradiation unit 10 includes one light source 21. However, the light irradiation device is not limited to this structure. For example, as illustrated in FIGS. 15 and 16, the irradiation unit 10 may also include a plurality of light sources 21. Further, for example, the plurality of light sources 21 may be configured to have the same output. Also, for example, a light source 21 may be configured to have a different output from that of at least one other light sources 21.

Further, regarding the structure including one irradiation unit 10, the description "the light source is disposed so as to emit light toward the wire member from one side in the circumferential direction of the wire member" indicates that the light source 21 emit light toward the wire member 200 from one side D4 with respect to a reference surface S1 including the center of the wire member 200, as illustrated in FIGS. 15 and 16. That is, the description indicates that there is provided no light source for emitting light toward the wire member 200 from the other side D5 with respect to the reference surface S1 (except "a secondary light source" having an output equal to or less than 25% of the output of the light source 21 having a largest output, out of the light sources 21 for emitting light toward the wire member 200 from the one side D4 with respect to the reference surface S1).

Figure 17:
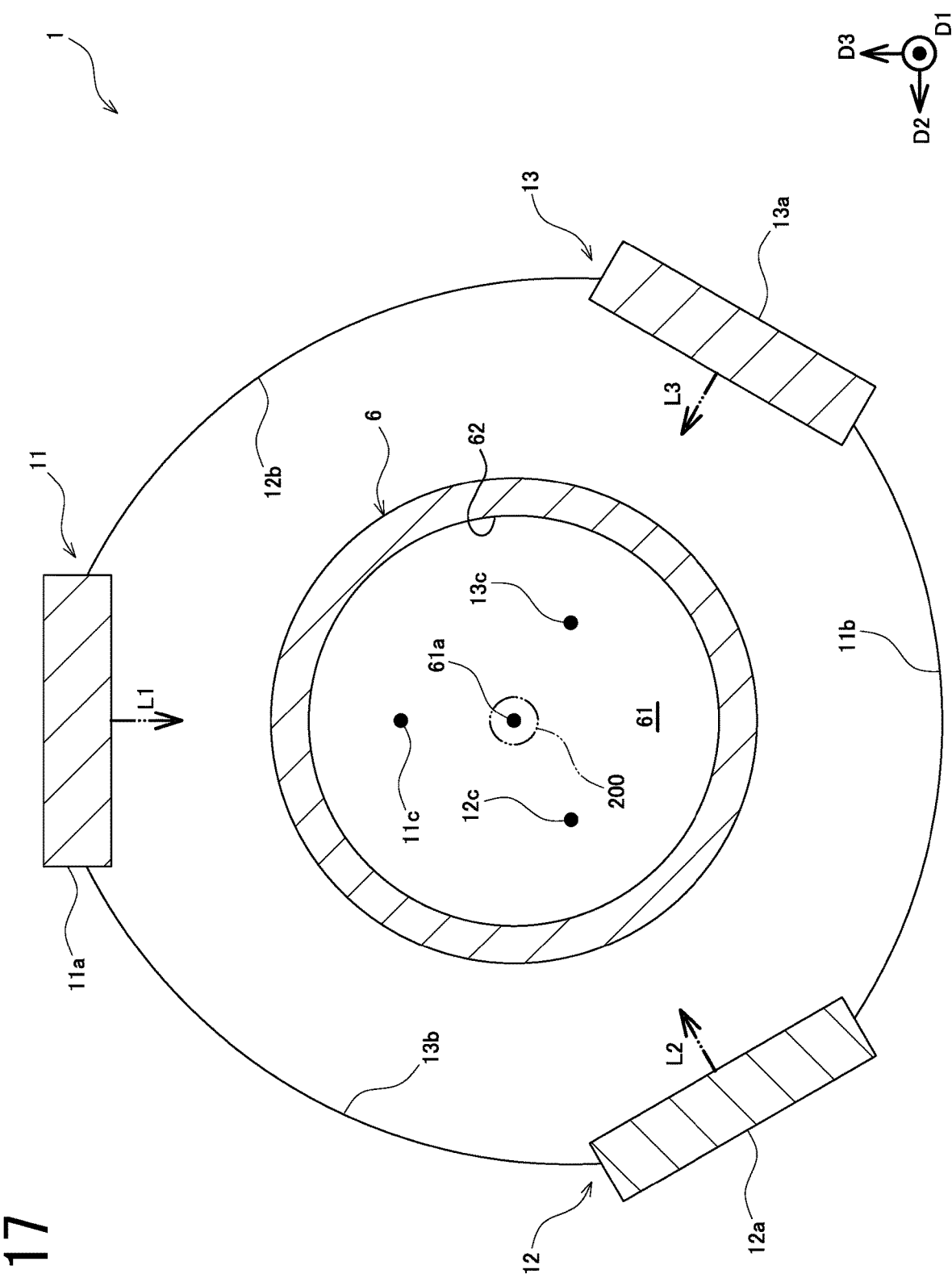
FIG. 17 is a cross-sectional view of main portions of a light irradiation device according to yet another embodiment.

Further, in the light irradiation device 1 and the light irradiation method according to the aforementioned embodiment, one irradiation unit 10 is provided in the circumferential direction of the reflective surface 52. However, the light irradiation device and method are not limited to this structure. For example, as illustrated in FIG. 17, a plurality of irradiation units 11, 12 and 13 (three irradiation units in FIG. 17) may be arranged in the circumferential direction of the reflective surface 52, such that light sources 11a, 12a and 13a emit light in a plurality of directions toward the wire member 200.

With this structure, since the plurality of irradiation units 11, 12 and 13 are arranged in the circumferential direction of the reflective surface 52, the respective light sources 11a, 12a and 13a emit light in a plurality of directions with respect to the wire member 200. This enables uniformly irradiating the wire member 200 with light over the circumferential direction. Hereinafter, the structure of the light irradiation device 1 in FIG. 17 will be described.

In the first irradiation unit 11, the first light source 11a is disposed to face a first reflective surface 11b, in the direction L1 of the optical axis of light emitted therefrom. In the second irradiation unit 12, the second light source 12a is disposed to face a second reflective surface 12b, in the direction 12 of the optical axis of light emitted therefrom. In the third irradiation unit 13, the third light source 13a is disposed to face a third reflective surface 13b, in the direction L3 of the optical axis of light emitted therefrom.

The center lie of the first reflective surface 11b is eccentric with respect to the center 61a of the insertion path 61. More specifically, the center 11c of the first reflective surface 11b is eccentric with respect to the center 61a of the insertion path 61 in the direction L1 of the optical axis. Still more specifically, the center 11c of the first reflective surface 11b is eccentric in such a direction as to get closer to the first light source 11a than the center 61a of the insertion path 61.

The center 12c of the second reflective surface 12b is eccentric with respect to the center 61a of the insertion path 61. More specifically, the center 12c of the second reflective surface 12b is eccentric with respect to the center 61a of the insertion path 61 in the direction L2 of the optical axis. Still more specifically, the center 12c of the second reflective surface 12b is eccentric such a direction as to get closer to the second light source 12a than the center 61a of the insertion path 61.

The center 13c of the third reflective surface 13b is eccentric with respect to the center 61a of the insertion path 61. More specifically, the center 13c of the third reflective surface 13b is eccentric with respect to the center 61a of the insertion path 61 in the direction 13 of the optical axis. Still more specifically, the center 13c of the third reflective surface 13b is eccentric in such a direction as to get closer to the third light source 13a than the center 61a of the insertion path 61.

Figure 18:
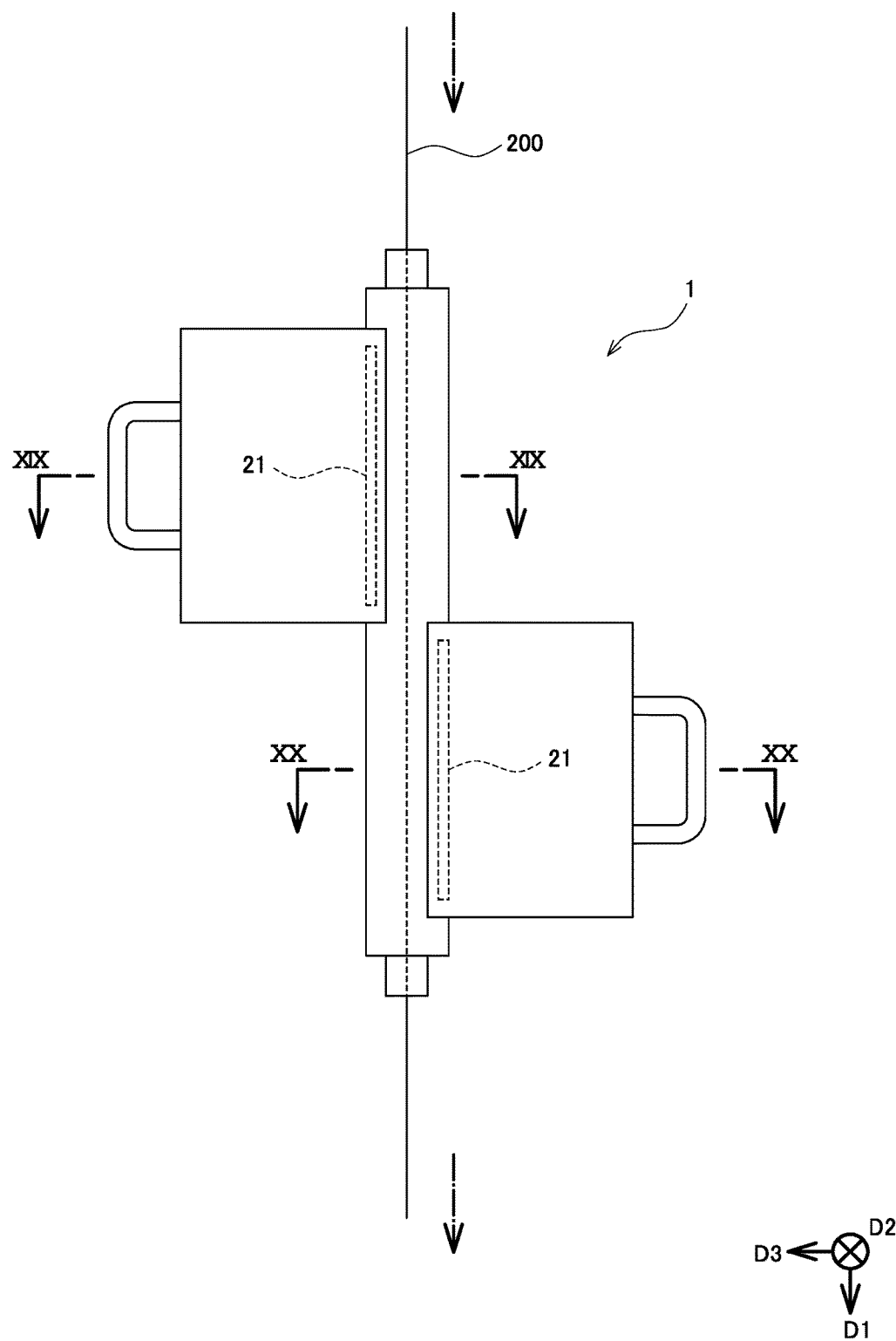
FIG. 18 is a view of entirety of a light irradiation device according to yet another embodiment, illustrating a state where a wire member is inserted therein.
Figure 19:
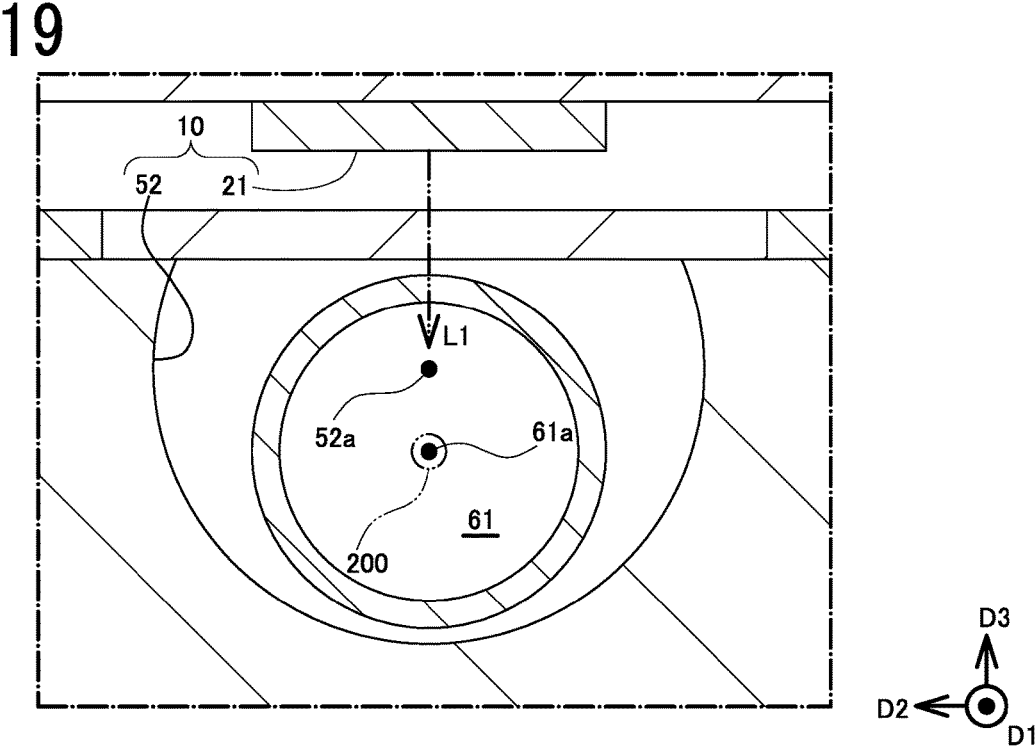
FIG. 19 is an enlarged cross-sectional view taken along line XIX-XIX in FIG. 18.
Figure 20:
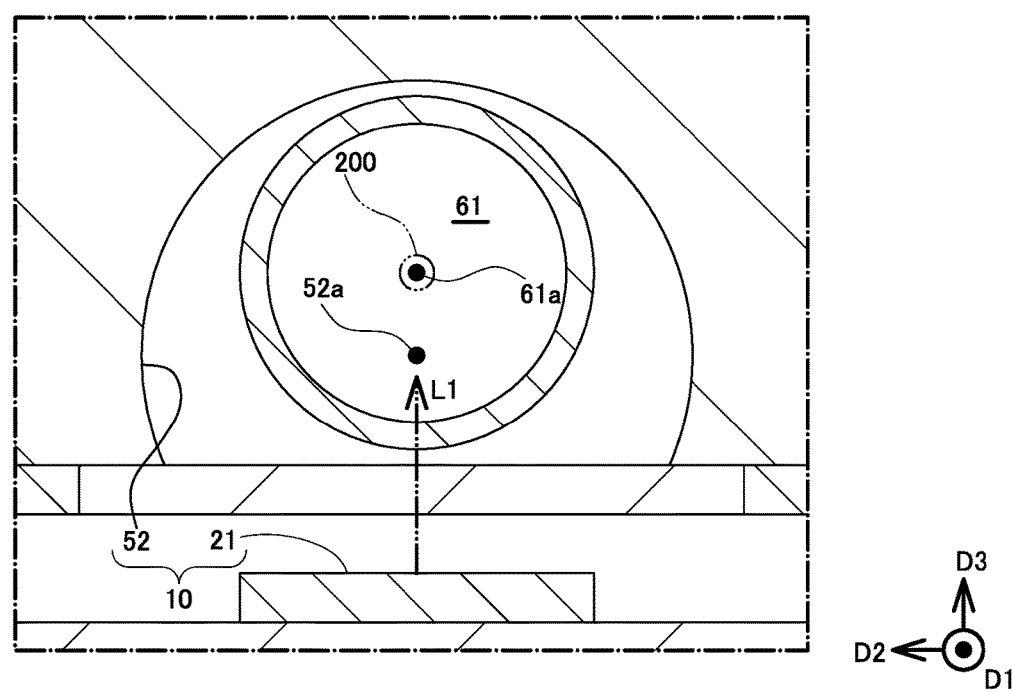
FIG. 20 is an enlarged cross-sectional view taken along line XX-XX in FIG. 18.

Further, in the light irradiation device 1 and the light irradiation method according to the aforementioned embodiment, one irradiation unit 10 is provided in the axial direction D1 of the reflective surface 52. However, the light irradiation device and method are not limited to this structure. For example, as illustrated in FIGS. 18 to 20, plurality of the irradiation units (two irradiation units in FIGS. 18 to 20) may be arranged in the axial direction D1 of the reflective surface 52. Further, as illustrated in FIGS. 18 to 20, the light sources 21 in the plurality of irradiation units 10 may be displaced from each other in the circumferential direction of the reflective surface 52, when viewed in the axial direction D1 of the reflective surface 52.

With this structure, the plurality of irradiation units 10 are arranged in the axial direction D1 of the reflective surface 52. Further, the light sources 21 in the plurality of irradiation units 10 are displaced from each other in the circumferential direction of the reflective surface 52, when viewed in the axial direction D1 of the reflective surface 52 and, therefore, the respective light sources 21 emit light in a plurality of directions with respect to the wire member 200. This enables uniformly irradiating the wire member 200 with light over the circumferential direction.

In the light irradiation device 1 in FIGS. 18 to 20, the direction L1 of the optical axis of the light source 21 in the irradiation unit 10 disposed in the upstream side (the upper side in FIG. 18, and FIG. 19) is the opposite direction from that of an arrow of a third direction D3. On the other hand, the direction L1 of the optical axis of the light source 21 in the irradiation unit 10 disposed in the downstream side (the lower side in FIG. 18, and FIG. 20) is the direction of the arrow of the third direction D3. Accordingly, the respective light sources 21 emit light in the completely opposite directions from each other with respect to the wire member 200.

Figure 21:
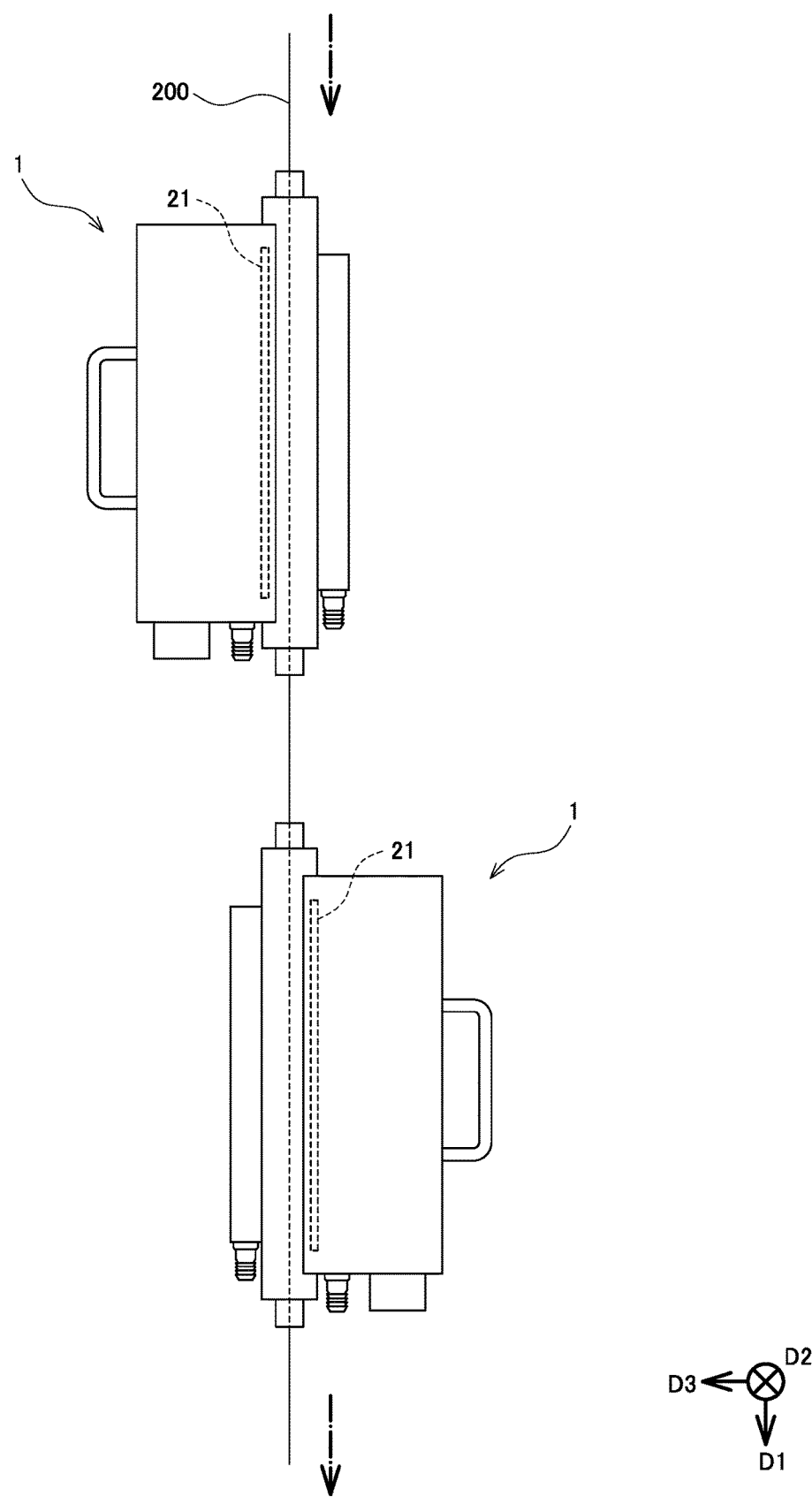
FIG. 21 is a view of entirety of a light irradiation device according to yet another embodiment, illustrating a state where a wire member is inserted therein.

Further, as illustrated in FIG. 21, a plurality of light irradiation devices 1 (two light irradiation devices in FIG. 21) may be arranged in the direction D1 of extension of the wire member 200 (the axial direction of the reflective surface 52). Further, as illustrated in FIG. 21, the light sources 21 in the plurality of light irradiation devices 1 may be displaced from each other about the direction D1 of extension of the wire member 200 (in the circumferential direction of the reflective surface 52), when viewed in the direction D1 of extension of the wire member 200.

With this structure, the plurality of light irradiation devices 1 are arranged in the direction D1 of extension of the wire member 200. Further, the light sources 21 in the plurality of light irradiation devices 1 are displaced about the direction D1 of extension of the wire member 200 when viewed in the direction D1 of extension of the wire member 200 and, therefore, the respective light sources 21 emit light in the plurality of directions with respect to the wire member 200. This enables uniformly irradiating the wire member 200 with light over the circumferential direction.

Hereinafter, there will be described the position of the light source 21, and the quantity of light which irradiates the wire member 200, out of light emitted from this position, with reference to FIGS. 22 to 24.

Figure 22:
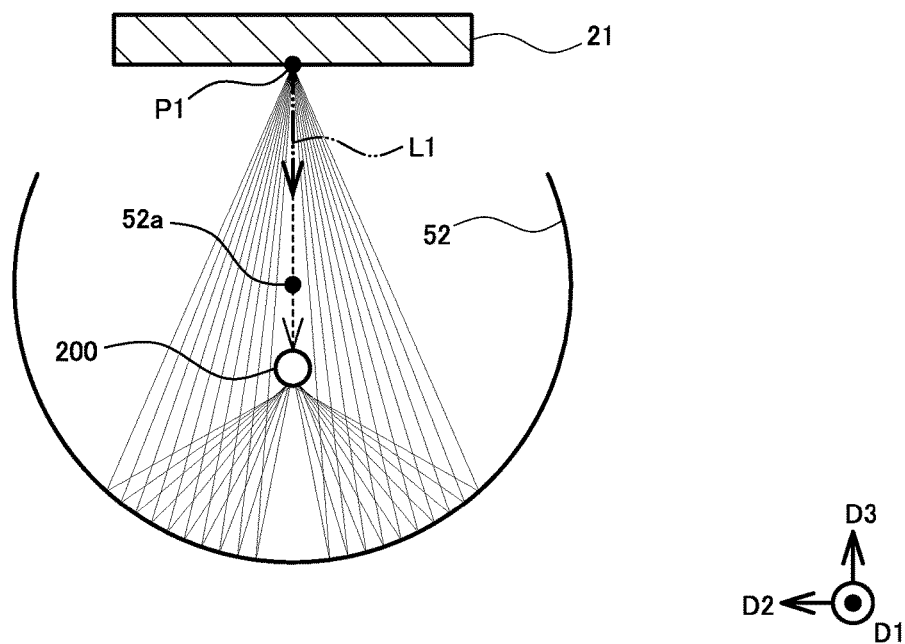
FIG. 22 is a cross-sectional view of main portions of the light irradiation device in the example in FIG. 5, illustrating a state where the wire member is irradiated with light.

FIG. 22 indicates light irradiating the wire member 200, out of light emitted radially (over the entire 180° range) from a first position P1 which faces the wire member 200, in the direction L1 of the optical axis of the light source 21. Further, FIG. 23 indicates light irradiating the wire member 200, out of light emitted radially (over the entire 180° range) from a second position P2 which does not face the wire member 200, in the direction L1 of the optical axis of the light source 21.

Further, in FIGS. 22 and 23, broken lines indicate light (hereinafter, referred to as "direct light") which directly irradiates the wire member 200 without passing the reflective surface 52, out of the light emitted from the light source 21. Further, solid lines indicate light (hereinafter, referred to as "reflected light") which irradiates the wire member 200 by being reflected only once by the reflective surface 52, out of the light emitted from the light source 21. Further, the first position P1 is at the center of the light source 21 in the widthwise direction D2, and the second position P2 is deviated from the first position P1 in the widthwise direction D2 of the light source 21.

Figure 23:
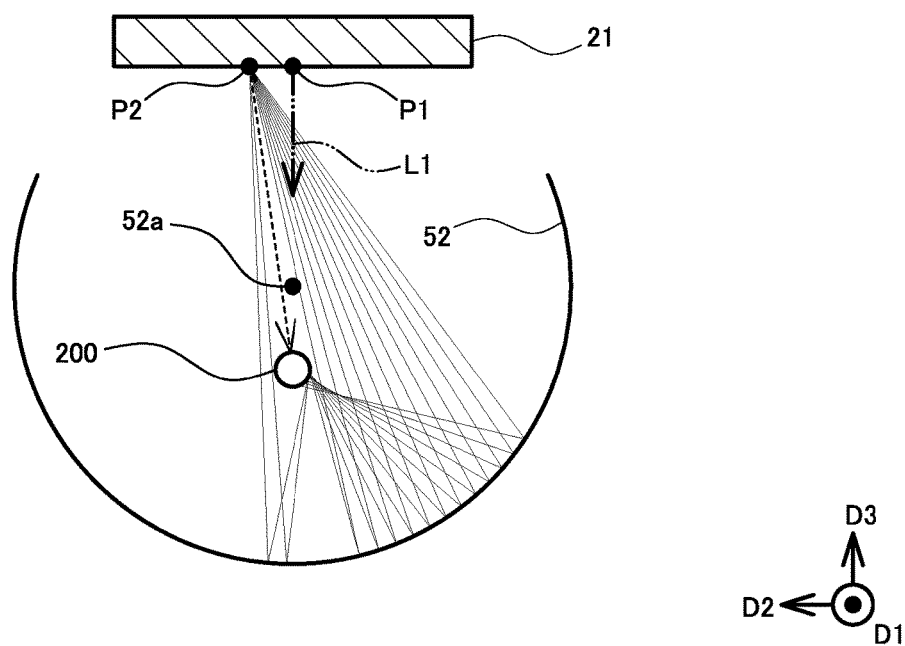
FIG. 23 is a cross-sectional view of main portions of the light irradiation device in the example in FIG. 5, illustrating a state where the wire member is irradiated with light.

At first, as illustrated in FIGS. 22 and 23, in the case of the first position P1, the range of the direct light, out of the range of the light emitted radially therefrom (180°), is substantially the same as that in the case of the second position P2. However, regarding the angle of the direct light with respect to the direction 101 of the optical axis of the light source 21, the angle in the case of the first position P1 is smaller than the angle in the case of the second position P2. Thus, regarding the light quantity of the direct light, the light quantity in the case of the first position P1 is larger than the light quantity in the case of the second position P2, since the quantity of light in the direction L1 of the optical axis, out of the light emitted from the light source 21, is largest.

Further, regarding the range of the reflected light, out of the range of the light emitted radially, the range in the case of the first position. P1 is larger than the range in the case of the second position P2. Furthermore, regarding the angle of the reflected with respect to the direction L1 of the optical axis of the light source 21, the angle in the case of the first position 91 is smaller than the angle in the case of the second position P2. Thus, regarding the light quantity of the reflected light, the light quantity in the case of the first position P1 is larger than the light quantity in the case of the second position P2.

As described above, in the case of the first position P1 which faces the wire member 200 in the direction L1 of the optical axis of the light source 21, the light quantity of the direct light and the light quantity of the reflected light are both larger than those an the case of toe second position P2 which does not face the wire member 200. Accordingly, with increasing distance from the position which faces the wire member 200 in the direction L1 of the optical axis of the light source 21, the quantity of light which irradiates the wire member 200, out of the light emitted from this position, is made smaller. This will be described in detail with reference to FIG. 24.

Figure 24:
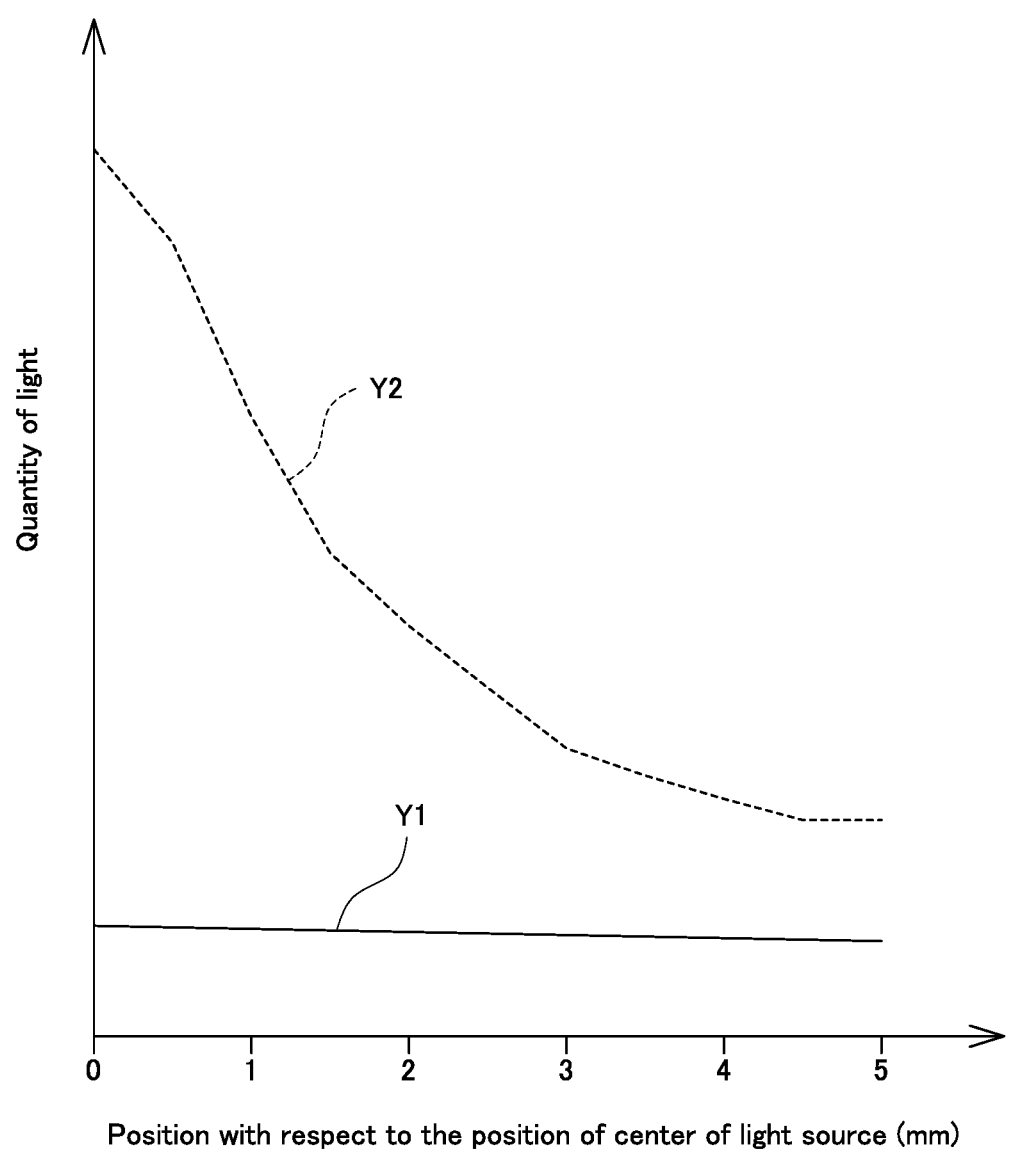
FIG. 24 is a graph illustrating a relationship between a position with respect to a center of the light source, and a quantity of light which irradiates a wire member after being emitted from this position.

Referring to FIG. 24, similarly to FIG. 14, the quantity of light which actually irradiated the wire member 200, out of light emitted from the light source 21, was determined, through ray tracing, assuming that the light was uniformly emitted from the entire surface of the light source 21, in the light irradiation device 1 in FIG. 13. Further, out of the conditions of the light irradiation device 1, a condition different from the conditions used for determining the aforementioned quantity of light in FIG. 14 was as follows.

The amount of eccentricity W5 of the center 52a of the reflective surface 52 with respect to the center of the wire member 200: 3.9 mm.

FIG. 24 shows the relationship between the position with respect to the position (that is, the position of the center of the light source 21) which faces the wire member 200 in the direction L1 of the optical axis of the light source 21, and the quantity of light which irradiated the wire member 200 out of the light emitted from the aforementioned position, in the light irradiation device 1 under the aforementioned conditions. Further, in FIG. 24, solid line Y1 indicates the quantity Y1 of direct irradiation light which directly irradiated the wire member 200 without passing the reflective surface 52, out of the light emitted from the aforementioned position. Further, a broken line Y2 indicates the quantity Y2 or reflected irradiation light which irradiated the wire member 200 by passing the reflective surface 52, out of the light emitted from the aforementioned position. Accordingly, the sum of the solid line Y1 and the broken line Y2 is the total quantity of irradiation light which actually irradiated the wire member 200, out of the light emitted from the aforementioned position.

At first, regarding the quantity Y1 of direct irradiation light, the quantity Y1 of direct irradiation light was largest when the aforementioned position was at the position of the center of the light source 21, and the quantity Y1 of direct irradiation light was made smaller as the aforementioned position was farther spaced apart from the position of the center of the light source 21. Further, regarding the quantity Y2 of reflected irradiation light, similarly, the quantity Y2 of reflected irradiation light was largest when the aforementioned position was at the position of the center of the light source 21, and the quantity Y2 of reflected irradiation light was made smaller as the aforementioned position was farther spaced apart from the position of the center of the light source 21. Accordingly, regarding the total quantity of irradiation light, the total quantity of irradiation light was largest when the aforementioned position was at the position of the center of the light source 21, and the total quantity of irradiation light was made smaller as the aforementioned position was farther spaced apart from the position of the center of the light source 21.

Accordingly, as described with reference to FIGS. 22 and 23, the quantity Y1 of direct irradiation light, the quantity Y2 of reflected irradiation light, and the total quantity of irradiation light were maximized when the aforementioned position was at the position facing the wire member 200 in the direction L1 of the optical axis of the light source 21, and these respective quantities of light were made smaller as the aforementioned position was farther spaced apart from this position. Thus, it is preferable that the light source 21 is disposed so as to face the wire member 200 in the direction L1 of the optical axis.

Therefore, for example, it is preferable that the width size of the light source 21 is equal to or less than half the diameter of the reflective surface 52, which can reduce the light-emission region with poor light efficiency, thereby further improving the light efficiency of the light source 21. Further, as illustrated in FIGS. 17 to 21, it is preferable that the light irradiation device 1 includes a plurality of light sources 21, and each light source 21 is disposed so as to face the wire member 200 (the center of the insertion path 61) in the direction L1 of the optical axis. With this structure, for example, even when the sum of the width sizes of the light sources 21 is the same (for example, 20 mm), there are provided the plurality of light sources 21 (for example, four light sources 21) having respective sizes (for example, 5 mm) into which a predetermined width size is divided, which can improve the light efficiency, as compared with structures including one light source 21 having a predetermined width size (for example, 20 mm).

Figure 25:
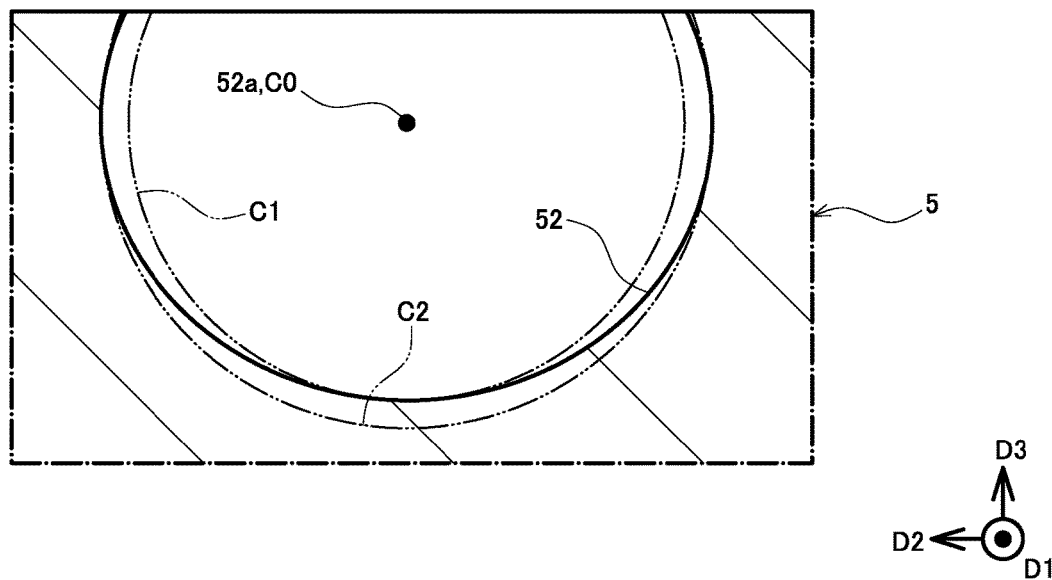
FIG. 25 is a cross-sectional view of main portions of a light irradiation device according to yet another embodiment.
Figure 26:
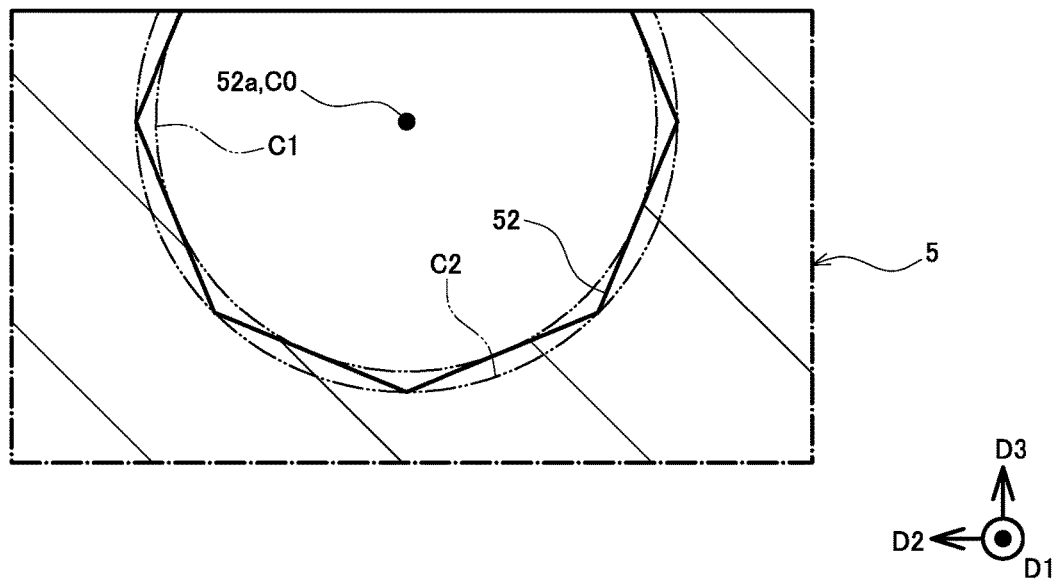
FIG. 26 is a cross-sectional view of main portions of a light irradiation device according to yet another embodiment.

Further, in the light irradiation device 1 and the light irradiation method according to the aforementioned embodiment, the reflective surface 52 is formed to have a substantially arc shape formed of a portion of a perfect circular shape. However, the light irradiation device and method are not limited to this structure. For example, as illustrated in FIG. 25, the reflective surface 52 can be formed to have a substantially arc shape formed of a portion of an elliptical shape. Also, for example, as illustrated in FIG. 26, the reflective surface 52 can be formed of a plurality of flat surfaces disposed in a substantially arc shape, that is, the reflective surface 52 can be formed to have a polygonal shape.

Further, the reflective surface 52 is required to be formed to have only a size sufficient to insert the wire member 200 therein. Further, for example, the reflective surface 52 may not only be formed to have a substantially arc shape formed of a portion of a circular shape but may also be formed to have a substantially arc shape formed of an entire circular shape (that is, a circular shape).

Note that the term "a substantially arc shape" in the description "a reflective surface disposed in a concave inner surface formed to have a substantially arc shape" refers to a shape which enters between two circles with centers C0 at the same position (a first circle C1 and a second circle C2), wherein the diameter of the first circle C1 and the diameter of the second circle C2 the diameter of the first circle C1) have a relationship satisfying the following formula, therebetween.

100%≤(the diameter of the second circle $C2$)/(the diameter of the first circle $C1$)≤110%

Further, preferably, the following formula can be satisfied.

100%≤(the diameter of the second circle $C2$)/(the diameter of the first circle $C1$)≤105%

Note that the position of "the center 52a of the substantially arc shape of the reflective surface 52" is the position of the centers C0 of the respective circles C1 and C2 in the case where "(the diameter of the second circle C2)/(the diameter of the first circle C1)" is minimized. Further, for example, as illustrated in FIG. 25, the reflective surface 52 may have a shape formed of a portion of an elliptical shape which enters between the first circle C1 and the second circle C2.

On the other hand, with a reflective curved surface in an elliptical mirror, a parabolic mirror or the like which does not satisfy the aforementioned formula, even by employing a structure where "the center of the wire member 200 is eccentric with respect to the focus position of this reflective curved surface", it is impossible to improve the light efficiency for irradiating the wire member 200 and the uniformity of light irradiation over the circumferential direction the wire member 200, as compared with structures where the center of the wire member 200 is positioned at the focus position of this reflective curved surface.

Figure 27:
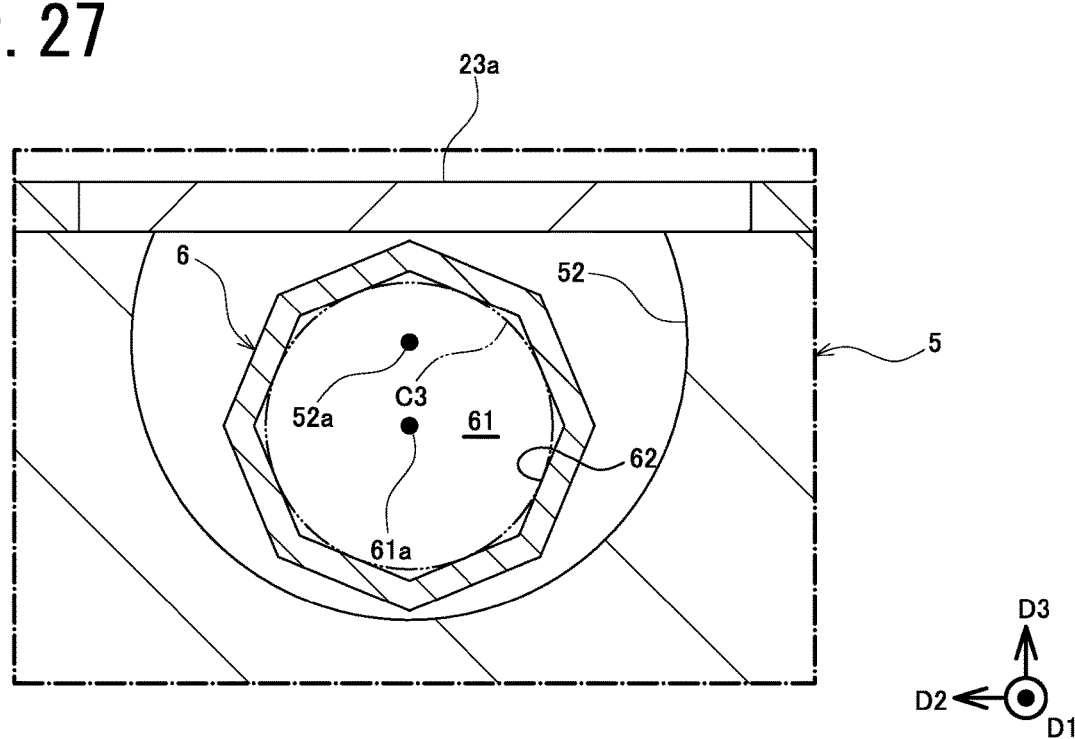
FIG. 27 is a cross-sectional view of main portions of a light irradiation device according to yet another embodiment.

Further, in the light irradiation device 1 and the light irradiation method according to the aforementioned embodiment, the insertion hole formed to have a circular shape. However, the light irradiation device and method are not limited to this structure. For example, the insertion hole 62 can be also formed to have an elliptical shape. Also, for example, the insertion hole 62 can be formed to have a polygonal shape, as illustrated in FIG. 27. Note that the center 61a of the insertion path 61 is the center of an inscribed circle which is inscribed on the surface forming the insertion path 61 (a circle C3 in FIG. 27).

Further, in the light irradiation device 1 and the light irradiation method according to the aforementioned embodiment, the insertion path 61 is formed by the insertion hole 62 which is a different structure from the reflective surface 52. However, the light irradiation device and method are not limited to this structure. For example, the light irradiation device may be also configured to include no insertion hole 62, the reflective surface 52 may be configured to form at least a portion of the insertion portion 6 such that the center 52a is eccentric with respect to the center 61a of the insertion path 61, as illustrated in FIG. 28.

Figure 28:
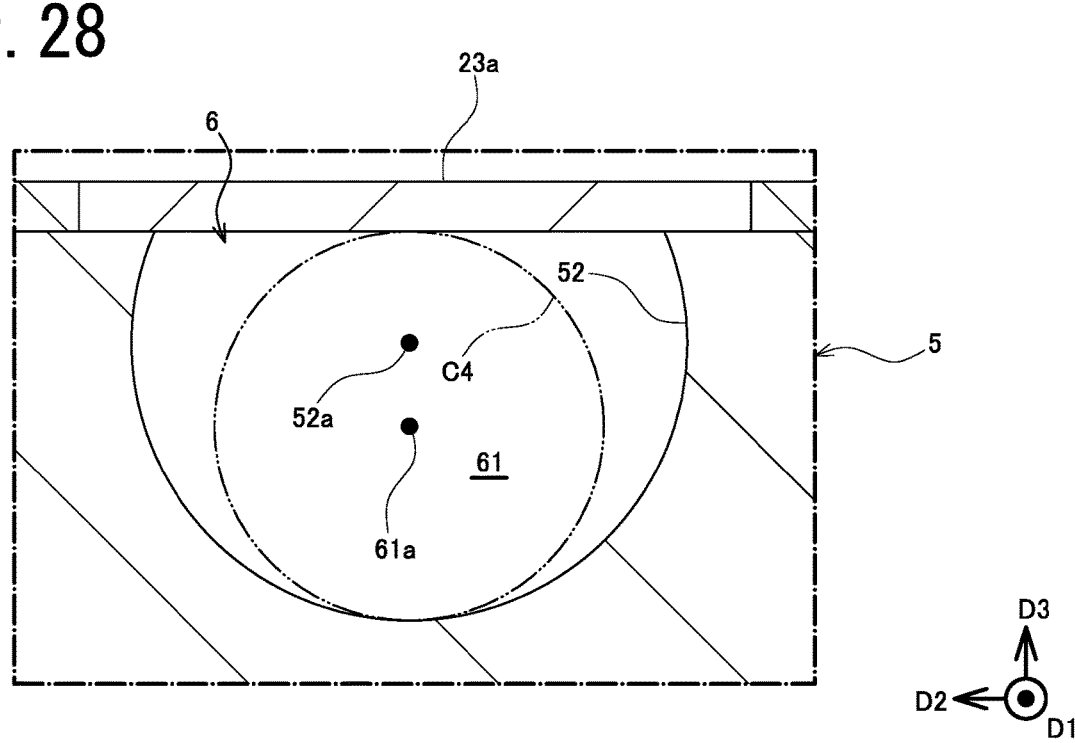
FIG. 28 is a cross-sectional view of main portions of a light irradiation device according to yet another embodiment.

The insertion portion 6 in FIG. 28 is formed by the reflective surface 52 and the light transmitting portion 23a in the light source device 2. Further, the insertion path 61 is constituted by an inner space formed by the reflective surface 52 and the light transmitting portion 23a. Further, the center 61a of the insertion path 61 is the center of an inscribed circle C4 which is inscribed on the surfaces forming the insertion path 61 (the reflective surface 52 and the surface of the light transmitting portion 23a in FIG. 28).

Further, in the light irradiation device 1 and the light irradiation method according to the aforementioned embodiment, the center 52a of the reflective surface 52 is eccentric with respect to the center 61a of the insertion path 61 in the direction L1 of the optical axis. However, the light irradiation device and method are not limited to this structure. For example, the center 52a of the reflective surface 52 may be also eccentric with respect to the center 61a of the insertion path 61 in a direction orthogonal to the direction L1 of the optical axis.

Further, in the light irradiation device 1 and the light irradiation method according to the aforementioned embodiment, the center 52a of the reflective surface 52 is eccentric in such a direction as to get closer to the light source 21 than the center 61a of the insertion path 61. However, the light irradiation device and method are not limited to this structure. For example, the center 52a of the reflective surface 52 may be also eccentric in such a direction as to get farther away from the light source 21 than the center 61a of the insertion path 61.

Further, in the light irradiation device 1 and the light irradiation method according to the aforementioned embodiment, the insertion portion 6 is formed to have an elongated tubular shape and is disposed inside and outside the reflective surface 52, so that the insertion hole 62 is disposed inside and outside the reflective surface 52. However, the light irradiation device and method are not limited to this structure. For example, the insertion hole 62 may be also disposed only inside the reflective surface 52. Also, for example, the insertion hole 62 may be disposed only outside the reflective surface 52 by being disposed in only the peripheral portion in which the insertion portion 6 is secured to the securing portion 7.

Further, in the light irradiation device 1 and the light irradiation method according to the aforementioned embodiment, the wire member 200 is constituted by an optical fiber. However, the light irradiation device and method are not limited to this structure. For example, the wire member 200 may be also constituted by a fiber. More specifically, the light irradiation device may be also a device for irradiating the wire member 200 constituted by a fiber with UV light for improving the quality of the surface of the fiber.

Further, in the light irradiation device 1 and the light irradiation method according to the aforementioned embodiment, the wire member 200 is irradiated with light, in a state of travelling inside the light irradiation device 1. However, the light irradiation device and method are not limited to this structure. For example, the wire member 200 may be also irradiated with light, in a state of being secured to the light irradiation device 1.

Further, in the light irradiation device 1 and the light irradiation method, when only one irradiation unit 10 is provided, the reflective surface 52 preferably occupies 33% (about 120°) or more of the circumferential direction about the center 52a. Further, more preferably, the reflective surface 52 occupies 50% (180°) or more of the circumferential direction about the center 52a. With this structure, the reflective surface 52 suppresses leakage of light to the outside, which enables utilizing light introduced into the reflective surface 52 more effectively.

Further, in the light irradiation device 1 and the light irradiation method, when only one irradiation unit 10 is provided, the reflective surface 52 preferably occupies 50% (180°) or more of the circumferential direction. With this structure, the reflective surface 52 suppresses leakage of light to the outside, which enables utilizing light introduced into the reflective surface 52 more effectively.

Further, in the light irradiation device 1 and the light irradiation method, the amount of eccentricity of the center of the wire member 200 (the center 61a of the insertion path 61) with respect to the center 52a of the substantially arc shape of the reflective surface 52 is, preferably, larger than the radius of the wire member 200 and, more preferably, larger than the diameter of the wire member 200. With this structure, the center 52a of the substantially arc shape of the reflective surface 52 is positioned outside the wire member 200, which can further improve the light efficiency.

Further, in the light irradiation method according to the aforementioned embodiment, the reflective surface 52 is disposed such that the center 52a is eccentric with respect to the center 61a of the insertion path 61. However, the light irradiation method is not limited to this structure. For example, the center 52a of the reflective surface 52 can be coincident with the center 61a of the insertion path 61 and, also, the wire member 200 may be inserted into the reflective surface 52 such that the center of the wire member 200 is eccentric with respect to the center 52a of the substantially arc shape of the reflective surface 52 (the center 61a of the insertion path 61a).

EXAMPLES

Hereinafter, there will be described examples and a comparative example of the light irradiation device 1, for concretely proving the structure and effects of the light irradiation device 1, with reference to FIGS. 29 and 33.

Further, regarding FIGS. 29 to 33, conditions different from the conditions used for determining the aforementioned quantity of light in FIG. 14, out of the conditions of the light irradiation device 1, were as follows.

The diameter of the reflective surface 52: 42.5 mm
The width size W1 of the light source 21: 20 mm
<Light Efficiency>

The ratio of the quantity of light which actually irradiated the wire member 200 to the quantity of light emitted from the light source 21 (the light efficiency) was determined, through ray tracing, assuming that the light was uniformly emitted from the entire surface of the light source 21. Further, phenomena which cause light losses include cases where light is repeatedly reflected by the reflective surface 52 to be attenuated without being incident to the wire member 200, cases where reflected light is incident to the light source 21 to be attenuated thereby, cases where light is incident to portions (for example, the light transmitting portion 23a and the like) other than the reflective surface 52 and the wire member 200, cases where light is attenuated when being reflected by the reflective surface 52, cases where light is attenuated when transmitting the insertion portion 6, and the like.

Figure 29:
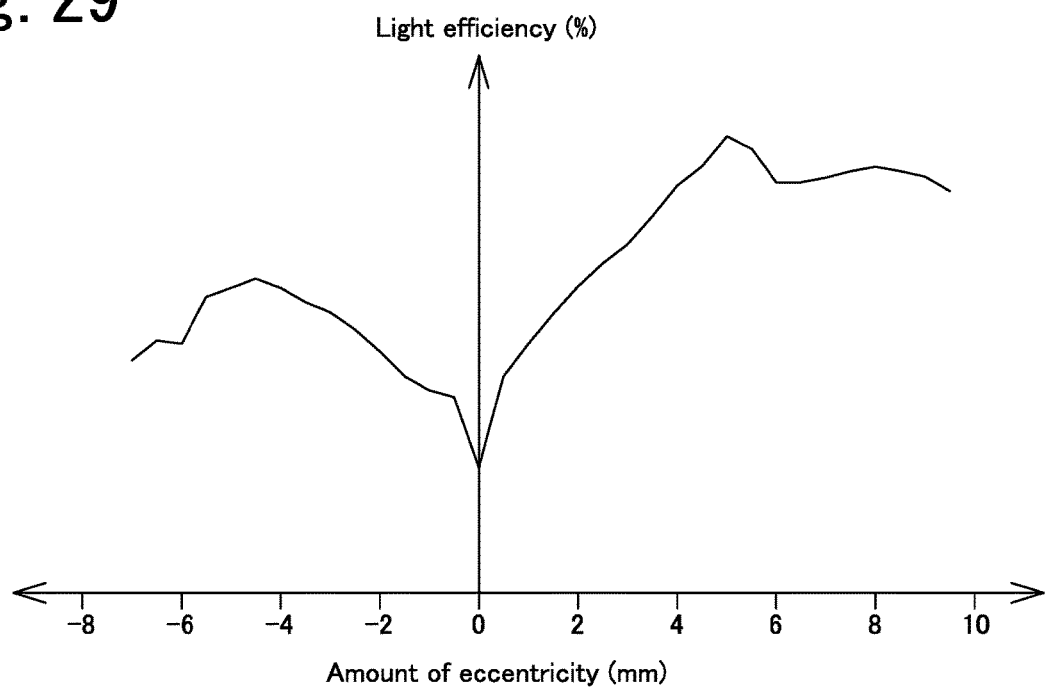
FIG. 29 is a graph illustrating a relationship between light efficiency and an amount of eccentricity of the center of the wire member with respect to the center of the reflective surface.

FIG. 29 illustrates the relationship between the amount of eccentricity W5 and the light efficiency, in the light irradiation device 1 under the aforementioned conditions. Further, it is assumed that the amount of eccentricity W5 is positive (+) when the center of the wire member 200 is eccentric with respect to the center 52a of the substantially arc shape of the reflective surface 52 in such a direction as to relatively get farther away from the light source 21, and the amount of eccentricity W5 is negative (−) when the center of the wire member 200 is eccentric with respect to the center 52a of the substantially arc shape of the reflective surface 52 in such a direction as to relatively get closer to the light source 21.

As illustrated in FIG. 29, in the examples where the amount of eccentricity W5 existed, the light efficiency was higher than the light efficiency in the comparative example where the amount of eccentricity W5 did not exist (the amount of eccentricity W5 was 0 mm). Thus, the light efficiency could be improved by making the center of the wire member 200 relatively eccentric with respect to the center 52*a* of the substantially arc shape of the reflective surface 52.

Further, in the examples where the center of the wire member 200 was eccentric with respect to the center 52*a* of the substantially arc shape of the reflective surface 52 is such a direction (in the positive side) as to relatively get farther away from the light source 21, the light efficiency could be further improved as compared with the examples where the center of the wire member 200 was eccentric with respect to the center 52*a* of the substantially arc shape of the reflective surface 52 in such a direction (in the negative side) as to relatively get closer to the light source 21.

Figure 30:
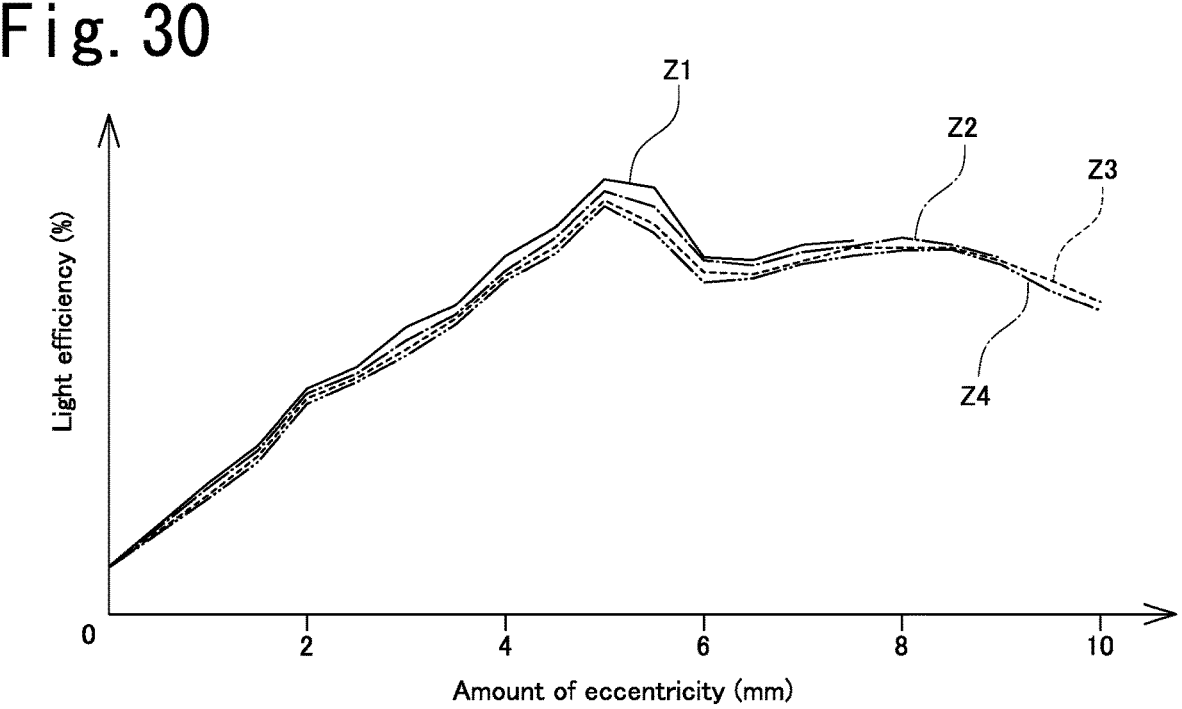
FIG. 30 is a graph illustrating the relationship between the light efficiency and the amount of eccentricity of the center of the wire member with respect to the center of the reflective surface.

FIG. 30 illustrates the relationship between the amount of eccentricity W5 and the light efficiency, in the light irradiation device 1 under the aforementioned conditions, wherein the diameter of the reflective surface 52 was varied in the light irradiation device 1. Graphs Z1 to a Z4 illustrate the light efficiencies in examples where the diameter of the reflective surface 52 was 38.5 mm, 41.5 mm, 44.5 mm and 47.5 mm, respectively. The amounts of eccentricity W5 were all such that the center of the wire member 200 was eccentric with respect to the center 52*a* of the substantially arc shape of the reflective surface 52 in such a direction as to relatively get farther away from the light source 21.

As illustrated in FIG. 30, with any of the diameters of the reflective surface 52, in the examples where the amount of eccentricity W5 existed, the light efficiencies were higher than the light efficiency in the comparative example where the amount of eccentricity W5 did not exist (the amount of eccentricity W5 was 0 mm). Thus, the light efficiency could be improved by making the center of the wire member 200 eccentric with respect to the center 52*a* of the substantially arc shape of the reflective surface 52, regardless of the diameter of the reflective surface 52.

Further, as illustrated in FIG. 30, it is preferable that the center of the wire member 200 (the center 61*a* of the insertion path 61) is eccentric, by 1.5 mm or more, with respect to the center 52*a* of the substantially arc shape of the reflective surface 52. Further, it is more preferable that the center of the wire member 200 (the center 61*a* of the insertion path 61) is eccentric, by 4.0 mm to 9.0 mm, with respect to the center 52*a* of the substantially arc shape of the reflective surface 52. Further, in the light irradiation device 1 under these conditions, when the amount of eccentricity W5 was 5 mm, the light efficiency could be most improved, regardless of the diameter of the reflective surface 52.

Further, in other words, it is preferable that the amount of eccentricity of the wire member 200 (the center 61*a* of the insertion path 61) with respect to the center 52*a* of the substantially arc shape of the reflective surface 52 is 12 times the diameter of the wire member 200. Further, it is more preferable that the amount of eccentricity of the wire member 200 (the center 61*a* of the insertion path 61) with respect to the center 52*a* of the substantially arc shape of the reflective surface 52 is 32 times to 72 times the diameter of the wire member 200. In the light irradiation device 1 under these conditions, when the amount of eccentricity W5 was 40 times the diameter of the wire member 200, the light efficiency could be most improved, regardless of the diameter of the reflective surface 52.

<Illuminance Distribution>

The illuminances at respective positions on the wire member 200 in the circumferential direction were determined, through ray tracing, assuming that light was uniformly emitted from the entire surface of the light source 21. Further, the position at 0° on the wire member 200 in the circumferential direction was defined as the position of an end point in the side facing the light source 21 (an upper end point 200*a* in FIG. 13), and the position at 180° in the circumferential direction was defined as the position of an end point in the opposite side from the side facing the light source 21 (a lower end point 200*b* in FIG. 13).

Figure 31:
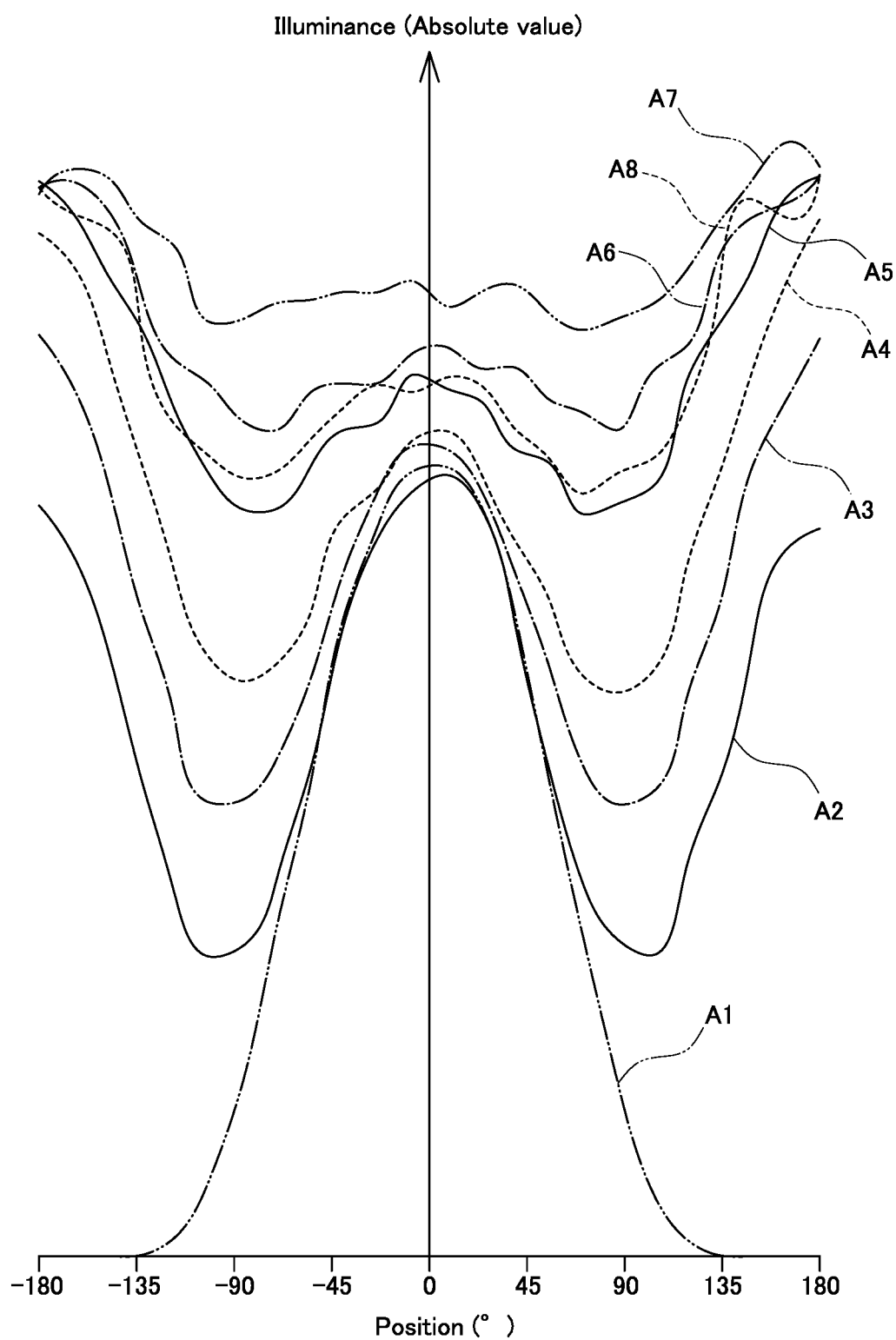
FIG. 31 is a graph illustrating a relationship between luminance and a position in a circumferential direction on the wire member.

FIG. 31 illustrates the relationship between the illuminance (the absolute value) and the position on the wire member 200 in the circumferential direction, in the light irradiation device 1 under the aforementioned conditions. A graph A1 indicates the illuminance in a comparative example where the amount of eccentricity W5 was 0 mm. Graphs A2 to A8 indicate the illuminances in examples where the amount of eccentricity W5 were 1 mm, 2 mm, 3 mm, 4 mm, 4.5 mm, 5 mm and 6 mm, respectively. These amounts of eccentricity W5 were all such that the center of the wire member 200 was eccentric with respect to the center 52*a* of the substantially arc shape of the reflective surface 52 in such a direction as to relatively get farther away from the light source 21.

As illustrated in FIG. 31, in the examples where the amount of eccentricity W5 existed, the illuminances A2 to A5 indicated that the wire member 200 was irradiated with light uniformly in the circumferential direction, as compared with the illuminance A1 in the comparative example where the amount of eccentricity W5 did not exist. Thus, the wire member 200 can be irradiated with light uniformly in the circumferential direction, by making the center of the wire member 200 eccentric with respect to the center 52*a* of the substantially arc shape of the reflective surface 52.

Figure 32:
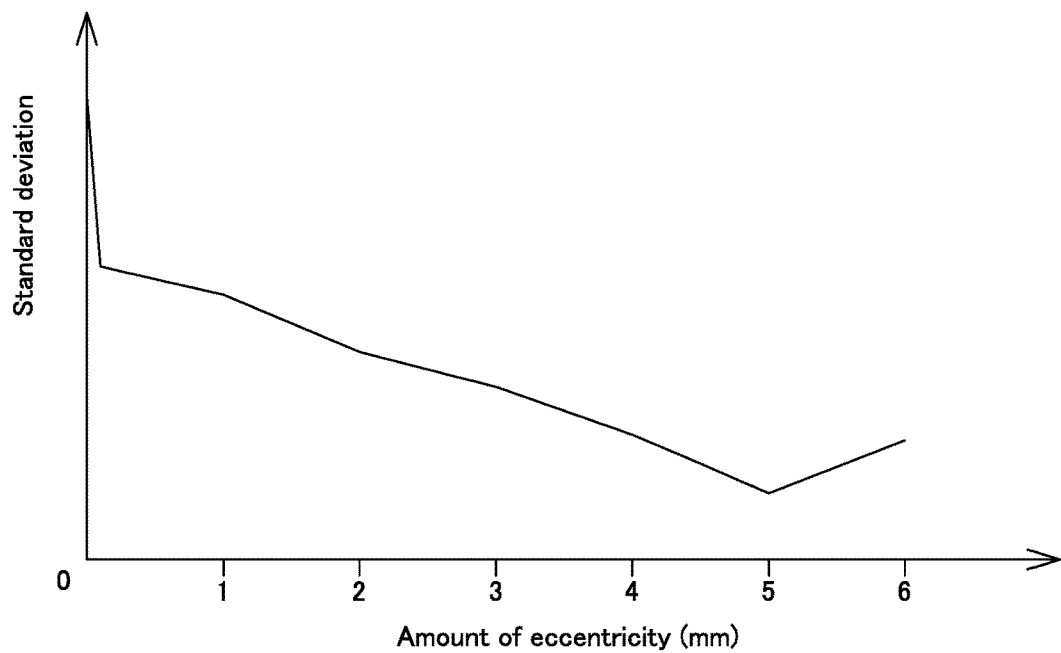
FIG. 32 is a graph illustrating a relationship between a standard deviation of the luminances at the respective positions in the circumferential direction on the wire member, and the amount of eccentricity of the center of the wire member with respect to the center of the reflective surface.

FIG. 32 illustrates the relationship between the amount of eccentricity W5, and the standard deviation of the illuminances at the respective positions on the wire member 200, in the light irradiation device 1 under the aforementioned conditions. In the light irradiation device 1 under the aforementioned conditions, when the amount of eccentricity W5 was 5 mm, the wire member 200 could be irradiated with light most uniformly in the circumferential direction.

Figure 33:
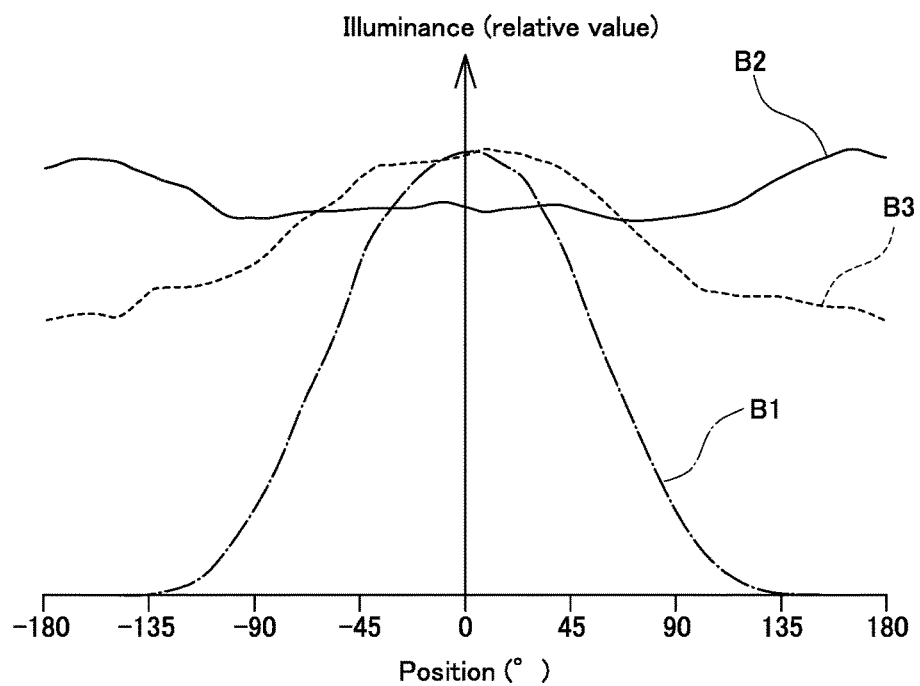
FIG. 33 is a graph illustrating the relationship between the luminance and the position in the circumferential direction on the wire member.

FIG. 33 illustrates the relationship between the illuminance (the relative value thereof with respect to a highest illumnance which is assumed to be 100) and the position in the circumferential direction on the wire member 200, in the light irradiation device 1 under the aforementioned conditions. A graph B1 indicates the illuminance in the comparative example where the amount of eccentricity W5 did not exist, similarly to FIG. 31. Graphs B2 to B3 indicate the illuminances in the examples where the amount of eccentricity W5 was 4.5 mm.

Further, the graph B2 indicates the illuminances in the example where the center 52*a* of the reflective surface 52 was eccentric with respect to the center of the wire member 200 in such a direction as to get closer to the light source 21 (the center of the wire member 200 was eccentric with respect to the center 52*a* of the reflective surface 52 of the substantially arc shape in such a direction as to relatively get farther away from the light source 21). Further, the graph B3 indicates the illuminances in the example where the center 52*a* of the reflective surface 52 was eccentric with respect to the center of the wire member 200 in such a direction as to get farther away from the light source 21 (the center of the wire member 200 was eccentric with respect to the center 52a of the reflective surface 52 of the substantially arc shape in such a direction as to relatively get closer to the light source 21).

As illustrated in FIG. 33, regarding the illuminance B2 in the example where the center 52a of the reflective surface 52 was eccentric with respect to the center of the wire member 200 in such a direction as to get closer to the light source 21 (the center of the wire member 200 was eccentric with respect to the center 52a of the substantially arc shape of the reflective surface 52 in such a direction as to relatively get farther away from the light source 21), the uniformity could be further improved over the circumferential direction of the wire member 200, as compared with the illuminance B3 in the example where the center 52a of the reflective surface 52 was eccentric with respect to the center of the wire member 200 in such a direction as to get farther away from the light source 21 (the center of the wire member 200 was eccentric with respect to the center 52a of the substantially arc shape of the reflective surface 52 in such a direction as to relatively get closer to the light source 21).

DESCRIPTION OF REFERENCE SIGNS

1 Light irradiation device
2 Light source device
3 Insertion device
4 Connection portion
4a Rotational shaft
5 Main body portion
6 Insertion portion
7 Securing portion
8 Main-body cooling portion
8a Cooling main body
8b Flow-in portion
8c Flow-out portion
10 Irradiation unit
11 First irradiation unit
11a First light source
11b First reflective surface
11c Center
12 Second irradiation unit
12a Second light source
12b Second reflective surface
12c Center
13 Third irradiation unit
13a Third light source
13b Third reflective surface
13c Center
21 Light source
22 Light-source cooling portion
22a Cooling main body
22b Flow-in portion
22c Flow-out portion
23 Casing
23a Light transmitting portion
23b Light shielding portion
24 Electric-power supply portion
24a Power-supply connection portion
24b Terminal table
51 Concave portion
52 Reflective surface
52a Center
53 Opening portion
54 Reflective end surface
61 Insertion path
61a Center
62 Insertion hole
71 Sandwiching portion
72 Sandwiching portion
100 Optical fiber production device
110 Conveying device
111 Conveying member
112 Conveying member
120 Coating device
200 Wire member (optical fiber)
200a End point
200b End point

The invention claimed is:

1. A light irradiation device comprising:
at least one irradiation unit including a reflective surface which is disposed in a concave inner surface and a light source; and
an insertion portion;
wherein the reflective surface extends in a direction of conveyance in which a wire member is to be conveyed,
the reflective surface is formed in such fashion as to permit the wire member to be disposed an inner side of the concave inner surface of the reflective surface,
the reflective surface is formed in such fashion that a cross section thereof in a plane orthogonal to the direction of conveyance is a circular arc shape,
the insertion portion is configured to interiorly form an insertion path for inserting the wire member into the reflective surface,
the light source emits light in a direction orthogonal to the direction of conveyance so that the light is directed toward the insertion path,
the light source has a light emitting portion emitting light from a plurality of positions in a widthwise direction orthogonal to the direction of an optical axis of the emitted light in the cross section thereof in the plane orthogonal to the direction of conveyance, and
the reflective surface is disposed such that a center of the circular arc shape is eccentric with respect to a center of the insertion path.

2. The light irradiation device according to claim 1, wherein
the reflective surface is disposed such that the center of the circular arc shape is eccentric with respect to the center of the insertion path in the direction of the optical axis.

3. The light irradiation device according to claim 2, wherein
the reflective surface is disposed such that the center of the circular arc shape is eccentric in such a direction as to get closer to the light source than the center of the insertion path.

4. The light irradiation device according to claim 1, wherein
the insertion portion includes an insertion hole interiorly forming the insertion path, and
the insertion hole is disposed at least inside or outside the reflective surface, such that the center of the insertion path is eccentric with respect to the center of the circular arc shape of the reflective surface.

5. The light irradiation device according to claim 1, wherein
the reflective surface forms at least a portion of the insertion portion, and is formed such that the center of the insertion path is eccentric with respect to the center of the circular arc shape of the reflective surface.

6. The light irradiation device according to claim 1, wherein
one irradiation unit is provided as the irradiation unit, and
the light source is disposed so as to emit light toward the wire member from one side in a circumferential direction of the wire member.

7. The light irradiation device according to claim 1, wherein
a plurality of the irradiation units are arranged in a circumferential direction of the reflective surface, such that the light sources emit light in a plurality of directions with respect to the wire member.

8. The light irradiation device according to claim 1, wherein
a plurality of the irradiation units are arranged in an axial direction of the reflective surface, and
the light sources in the plurality of the irradiation units are displaced from each other in the circumferential direction of the reflective surface, when viewed in the axial direction of the reflective surface.

9. A light irradiation method for irradiating a wire member with light through a light irradiation device,
the light irradiation device including at least one irradiation unit including a reflective surface which is disposed in a concave inner surface formed to have a substantially arc shape and into which the wire member is inserted, and a light source which is configured to emit light toward the wire member and is disposed so as to face the reflective surface in a direction of an optical axis of the emitted light,
wherein the reflective surface formed to have the substantially arc shape has a shape which enters between a first circle inscribed on the reflective surface and a second circle which is circumscribed on the reflective surface and has a center at the same position as that of the first circle, and the following formula is satisfied:

100%≤(a diameter of the second circle $C2$)/(a diameter of the first circle $C1$)≤110%, the light source has a light emitting portion emitting light from a plurality of positions in a widthwise direction orthogonal to the direction of the optical axis,
the light irradiation method comprising:
inserting the wire member into the reflective surface such that a center of the wire member is eccentric with respect to a center of the substantially arc shape of the reflective surface; and
emitting light toward the wire member from the light source.

10. A light irradiation device comprising:
at least one irradiation unit including a reflective surface which is disposed in a concave inner surface formed to have a substantially arc shape and into which a wire member is inserted, and a light source which is configured to emit light toward the wire member and is disposed so as to face the reflective surface in a direction of an optical axis of the emitted light; and
an insertion portion configured to interiorly form an insertion path for inserting the wire member into the reflective surface,
wherein the reflective surface formed to have the substantially arc shape has a shape which enters between a first circle inscribed on the reflective surface and a second circle which is circumscribed on the reflective surface and has a center at the same position as that of the first circle, and the following formula is satisfied:

100%≤(a diameter of the second circle $C2$)/(a diameter of the first circle $C1$)≤110%, the light source has a light emitting portion emitting light from a plurality of positions in a widthwise direction orthogonal to the direction of the optical axis, and
the reflective surface is disposed such that a center of the substantially arc shape is eccentric with respect to a center of the insertion path.

11. The light irradiation device according to claim 10, wherein
the reflective surface is disposed such that the center of the substantially arc shape is eccentric with respect to the center of the insertion path in the direction of the optical axis.

12. The light irradiation device according to claim 11, wherein
the reflective surface is disposed such that the center of the substantially arc shape is eccentric in such a direction as to get closer to the light source than the center of the insertion path.

13. The light irradiation device according to claim 10, wherein
the insertion portion includes an insertion hole interiorly forming the insertion path, and
the insertion hole is disposed at least inside or outside the reflective surface, such that the center of the insertion path is eccentric with respect to the center of the substantially arc shape of the reflective surface.

14. The light irradiation device according to claim 10, wherein
the reflective surface forms at least a portion of the insertion portion, and is formed such that the center of the insertion path is eccentric with respect to the center of the substantially arc shape of the reflective surface.

15. The light irradiation device according to claim 10, wherein
the reflective surface is formed of a curved surface.

16. The light irradiation device according to claim 10, wherein
the reflective surface is formed of a plurality of flat surfaces disposed in a substantially arc shape.

17. The light irradiation device according to claim 10, wherein
one irradiation unit is provided as the irradiation unit, and
the light source is disposed so as to emit light toward the wire member from one side in a circumferential direction of the wire member.

18. The light irradiation device according to claim 10, wherein
a plurality of the irradiation units are arranged in a circumferential direction of the reflective surface, such that the light sources emit light in a plurality of directions with respect to the wire member.

19. The light irradiation device according to claim 10, wherein
a plurality of the irradiation units are arranged in an axial direction of the reflective surface, and
the light sources in the plurality of the irradiation units are displaced from each other in the circumferential direction of the reflective surface, when viewed in the axial direction of the reflective surface.

* * * * *